US012567920B2

(12) United States Patent
Stojanovic et al.

(10) Patent No.: US 12,567,920 B2
(45) Date of Patent: Mar. 3, 2026

(54) LOW-POWER OPTICAL INPUT/OUTPUT CHIPLET FOR ETHERNET SWITCHES (TeraPHYe)

(71) Applicant: Ayar Labs, Inc., Santa Clara, CA (US)

(72) Inventors: Vladimir Stojanovic, Berkeley, CA (US); Hugo Saleh, Tuscaloosa, AL (US); Roy Edward Meade, Lafayette, CA (US)

(73) Assignee: Ayar Labs, Inc., San Jose, CA (US)

( * ) Notice: Subject to any disclaimer, the term of this patent is extended or adjusted under 35 U.S.C. 154(b) by 558 days.

(21) Appl. No.: 17/527,483

(22) Filed: Nov. 16, 2021

(65) Prior Publication Data

US 2022/0166533 A1     May 26, 2022

Related U.S. Application Data

(60) Provisional application No. 63/116,695, filed on Nov. 20, 2020.

(51) Int. Cl.
H04B 10/40          (2013.01)
H04J 14/02          (2006.01)
(Continued)

(52) U.S. Cl.
CPC .......... H04J 14/0267 (2013.01); H04B 10/40 (2013.01); H04L 49/351 (2013.01); H04Q 11/0067 (2013.01)

(58) Field of Classification Search
CPC ..................................................... H04B 10/40
See application file for complete search history.

(56) References Cited

U.S. PATENT DOCUMENTS 9,164,026 B2     10/2015   Chakravarty et al.
2003/0053170 A1*   3/2003   Levinson ............... H04B 10/40
                                                                    398/139

(Continued)

OTHER PUBLICATIONS

Sun et al.; "Single-chip microprocessor that communicates directly using light"; Nature 528.7583; 2015; p. 534-535. (Year: 2015).*

(Continued)

*Primary Examiner* — Nathan M Cors
(74) *Attorney, Agent, or Firm* — Penilla IP, APC

(57)          ABSTRACT

A network switch system-in-package includes a carrier substrate with a network switch chip and a plurality of photonic input/output modules disposed on the carrier substrate. Each of the plurality of photonic input/output modules includes a module substrate and a plurality of photonic chip pods disposed on the module substrate. Each photonic chip pod includes a pod substrate with a photonic input/output chiplet and a gearbox chiplet attached to the pod substrate. The photonic input/output chiplet includes a parallel electrical interface, a photonic interface, and a plurality of optical macros implemented between the photonic interface and the parallel electrical interface. The gearbox chiplet electrically connects with the parallel electrical interface of the photonic input/output chiplet and a serial electrical interface of the network switch chip. The gearbox chiplet converts between the parallel electrical interface of the photonic input/output chiplet and the serial electrical interface of the network switch chip.

20 Claims, 16 Drawing Sheets

(51) Int. Cl.
    *H04L 49/351*     (2022.01)
    *H04Q 11/00*     (2006.01)

(56)               References Cited

U.S. PATENT DOCUMENTS

| | | | |
|---|---|---|---|
| 2007/0065153 A1* | 3/2007 | Hong | H04J 14/0246 |
| | | | 398/138 |
| 2015/0222364 A1* | 8/2015 | Hwang | H01L 24/00 |
| | | | 398/138 |
| 2016/0109659 A1 | 4/2016 | Jiang | |
| 2017/0124022 A1 | 5/2017 | Nagarajan et al. | |
| 2017/0245388 A1* | 8/2017 | Morris | H05K 7/1451 |
| 2018/0372952 A1 | 12/2018 | Zhang et al. | |
| 2020/0021384 A1* | 1/2020 | Stojanovic | H04J 14/0278 |
| 2020/0355880 A1 | 11/2020 | Wright et al. | |

OTHER PUBLICATIONS

International Application No. PCT/US2021/059514, International Search Report and Written Opinion of the International Searching Authority, Mar. 25, 2022.

* cited by examiner

| Switch System-In-Package Energy Breakdown | | | |
|---|---|---|---|
| TeraPHYe Module | 50 Tbps System CWDM | 100 Tbps System CWDM | 100 Tbps System WDM |
| Number of TeraPHYe modules per switch | 8 | 8 | 8 |
| Number of ports per module | 16 | 16 | 16 |
| Number of wavelengths per port | 4 | 8 | 16 |
| Data rate per wavelength (bps) | 1.0625E+11 | 1.0625E+11 | 5.3125E+10 |
| Aggregate module data rate (bps) | 6.8000E+12 | 1.3600E+13 | 1.3600E+13 |
| Aggregate switch data rate (bps) | 5.4400E+13 | 1.0880E+14 | 1.0880E+14 |
| Gearbox Chip | | | |
| 112G XSR/USR interface energy/bit (J/bit) | 1.61E-12 | n/a | n/a |
| Glue energy/bit (J/bit) | 2.00E-13 | n/a | n/a |
| AIB energy/bit (J/bit) | 8.00E-13 | n/a | n/a |
| Gearbox energy/bit total (J/bit) | 2.61E-12 | n/a | n/a |
| Gearbox power per module (W) | 1.8E+01 | n/a | n/a |
| TeraPHYe Chiplet | | | |
| AIB energy/bit (J/bit) (AIB 1.0 to 2.0 or HBI) | 1.00E-12 | 6.00E-13 | 6.00E-13 |
| Glue energy/bit (J/bit) | 2.00E-13 | 2.00E-13 | 2.00E-13 |
| TeraPHYe macro energy/bit (J/bit) (with wavelength control thermal tuning) | 5.00E-12 | 4.60E-12 | 2.50E-12 |
| TeraPHYe total energy/bit (J/bit) | 6.20E-12 | 5.40E-12 | 3.30E-12 |
| TeraPHYe power per module (W) | 4.2E+01 | 7.3E+01 | 4.5E+01 |
| Total TeraPHYe module power (W) | 6.0E+01 | 7.3E+01 | 4.5E+01 |
| Switch | | | |
| Switch I/O energy/bit (J/bit) (XSR to AIB 2.0 or HBI) | 1.61E-12 | 5.00E-13 | 5.00E-13 |
| Switch I/O power (W) | 8.75E+01 | 5.44E+01 | 5.44E+01 |
| TeraPHYe total module power per switch (W) | 4.8E+02 | 5.9E+02 | 3.6E+02 |
| Total switch package I/O power (W) | 5.67E+02 | 6.42E+02 | 4.13E+02 |

Figures 16, 17:
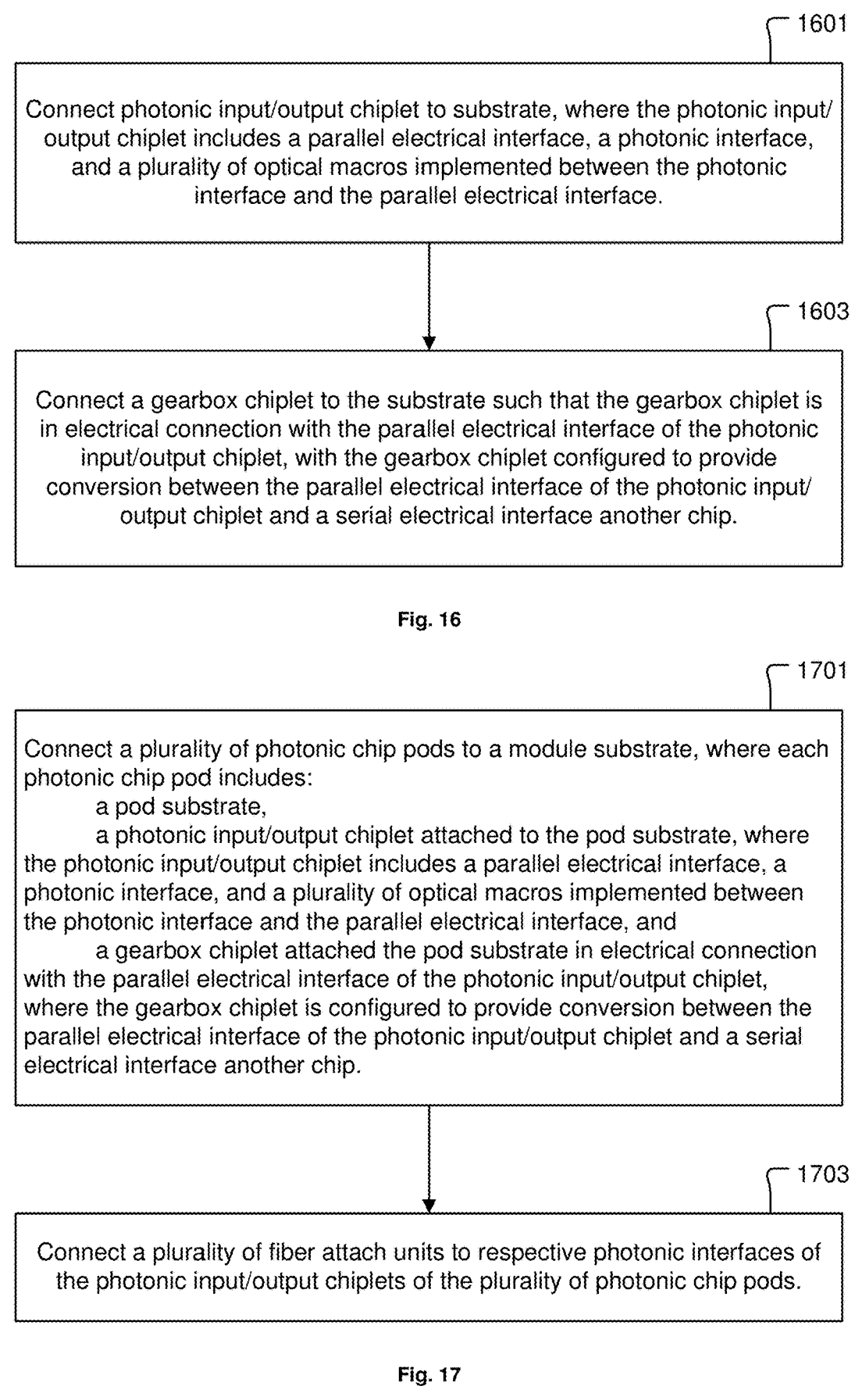

Connect photonic input/output chiplet to substrate, where the photonic input/ output chiplet includes a parallel electrical interface, a photonic interface, and a plurality of optical macros implemented between the photonic interface and the parallel electrical interface.

1603

Connect a gearbox chiplet to the substrate such that the gearbox chiplet is in electrical connection with the parallel electrical interface of the photonic input/output chiplet, with the gearbox chiplet configured to provide conversion between the parallel electrical interface of the photonic input/ output chiplet and a serial electrical interface another chip.

Connect a plurality of photonic chip pods to a module substrate, where each photonic chip pod includes:
      a pod substrate,
      a photonic input/output chiplet attached to the pod substrate, where the photonic input/output chiplet includes a parallel electrical interface, a photonic interface, and a plurality of optical macros implemented between the photonic interface and the parallel electrical interface, and
      a gearbox chiplet attached the pod substrate in electrical connection with the parallel electrical interface of the photonic input/output chiplet, where the gearbox chiplet is configured to provide conversion between the parallel electrical interface of the photonic input/output chiplet and a serial electrical interface another chip.

1703

Connect a plurality of fiber attach units to respective photonic interfaces of the photonic input/output chiplets of the plurality of photonic chip pods.

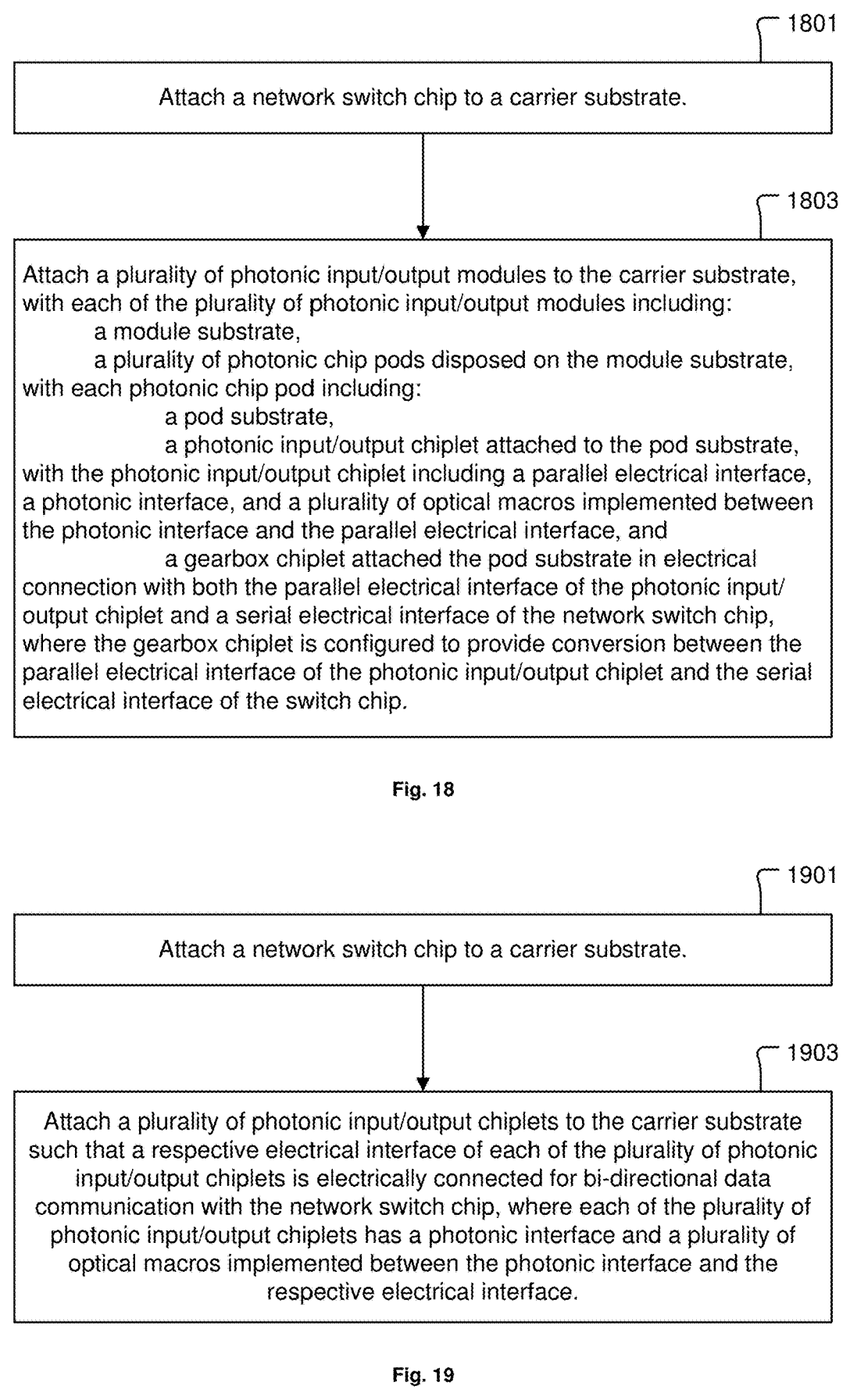

Attach a network switch chip to a carrier substrate.

1803

Attach a plurality of photonic input/output modules to the carrier substrate, with each of the plurality of photonic input/output modules including:
      a module substrate,
      a plurality of photonic chip pods disposed on the module substrate, with each photonic chip pod including:
            a pod substrate,
            a photonic input/output chiplet attached to the pod substrate, with the photonic input/output chiplet including a parallel electrical interface, a photonic interface, and a plurality of optical macros implemented between the photonic interface and the parallel electrical interface, and
            a gearbox chiplet attached the pod substrate in electrical connection with both the parallel electrical interface of the photonic input/output chiplet and a serial electrical interface of the network switch chip, where the gearbox chiplet is configured to provide conversion between the parallel electrical interface of the photonic input/output chiplet and the serial electrical interface of the switch chip.

Attach a network switch chip to a carrier substrate.

1903

Attach a plurality of photonic input/output chiplets to the carrier substrate such that a respective electrical interface of each of the plurality of photonic input/output chiplets is electrically connected for bi-directional data communication with the network switch chip, where each of the plurality of photonic input/output chiplets has a photonic interface and a plurality of optical macros implemented between the photonic interface and the respective electrical interface.

Fig. 19

LOW-POWER OPTICAL INPUT/OUTPUT CHIPLET FOR ETHERNET SWITCHES (TeraPHYe)

CLAIM OF PRIORITY

This application claims priority under 35 U.S.C. 119(e) to U.S. Provisional Patent Application No. 63/116,695, filed on Nov. 20, 2020, the disclosure of which is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient devices for modulating optical signals and for receiving optical signals. It is within this context that the present invention arises.

SUMMARY

In an example embodiment, a photonic chip pod is disclosed. The photonic chip pod includes a substrate, a photonic input/output chiplet attached to the substrate, and a gearbox chiplet attached the substrate. The photonic input/output chiplet includes a parallel electrical interface, a photonic interface, and a plurality of optical macros implemented between the photonic interface and the parallel electrical interface. The gearbox chiplet is attached to the substrate in electrical connection with the parallel electrical interface of the photonic input/output chiplet. The gearbox chiplet is configured to provide conversion between the parallel electrical interface of the photonic input/output chiplet and a serial electrical interface of another chip.

In an example embodiment, a photonic input/output module is disclosed. The photonic input/output module includes a module substrate and a plurality of photonic chip pods disposed on the module substrate. Each photonic chip pod of the plurality of photonic chip pods includes a pod substrate, a photonic input/output chiplet attached to the pod substrate, and a gearbox chiplet attached the pod substrate. The photonic input/output chiplet includes a parallel electrical interface, a photonic interface, and a plurality of optical macros implemented between the photonic interface and the parallel electrical interface. The gearbox chiplet is attached the pod substrate in electrical connection with the parallel electrical interface of the photonic input/output chiplet. The gearbox chiplet is configured to provide conversion between the parallel electrical interface of the photonic input/output chiplet and a serial electrical interface of another chip.

In an example embodiment, a network switch system-in-package is disclosed. The network switch system-in-package includes a carrier substrate, a network switch chip disposed on the carrier substrate, and a plurality of photonic input/output modules disposed on the carrier substrate. Each of the plurality of photonic input/output modules includes a module substrate and a plurality of photonic chip pods disposed on the module substrate. Each photonic chip pod of the plurality of photonic chip pods includes a pod substrate, a photonic input/output chiplet attached to the pod substrate, and a gearbox chiplet attached to the pod substrate. The photonic input/output chiplet includes a parallel electrical interface, a photonic interface, and a plurality of optical macros implemented between the photonic interface and the parallel electrical interface. The gearbox chiplet is attached the pod substrate in electrical connection with both the parallel electrical interface of the photonic input/output chiplet and a serial electrical interface of the network switch chip. The gearbox chiplet is configured to provide conversion between the parallel electrical interface of the photonic input/output chiplet and the serial electrical interface of the network switch chip.

In an example embodiment, a network switch system-in-package is disclosed. The network switch system-in-package includes a carrier substrate, a network switch chip disposed on the carrier substrate, and a plurality of photonic input/output chiplets attached to the carrier substrate. Each of the plurality of photonic input/output chiplets includes an electrical interface electrically connected for bi-directional data communication with the network switch chip. Each of the plurality of photonic input/output chiplets also includes a photonic interface and a plurality of optical macros implemented between the photonic interface and the electrical interface.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 13 shows a table that includes an energy breakdown for the 50 Tbps Ethernet switch system-in-package solution of FIG. 11 and for two variants of the 100 Tbps Ethernet switch system-in-package solution of FIG. 12, in accordance with some embodiments.

FIG. 16 shows a flowchart of a method for manufacturing a photonic chip pod, in accordance with some embodiments.

FIG. 17 shows a flowchart of a method for manufacturing a photonic input/output module, in accordance with some embodiments.

FIG. 18 shows a flowchart of a method for manufacturing a network switch system-in-package, in accordance with some embodiments.

FIG. 19 shows a flowchart of a method for manufacturing a network switch system-in-package, in accordance with some embodiments.

DETAILED DESCRIPTION

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

Embodiments are disclosed herein for low-power optical input/output (I/O) chiplets for Ethernet switches. In some embodiments, an Ethernet switch includes a chip, pod, module, and system-in-package configuration based on the monolithically-integrated photonic I/O (MIPO I/O) Tera-PHY chiplet provided by Ayar Labs, Inc., of Santa Clara, California, with the TeraPHY chiplet adapted for optical and electrical compatibility with Ethernet switches. The adapted version of TeraPHY chiplet is referred to as a TeraPHYe chiplet. In some embodiments disclosed herein, an Ethernet switch based on the TeraPHYe chiplet is capable of a data transfer rate of 50 Terabits per second (Tbps) or more. In some embodiments disclosed herein, an Ethernet switch based on the TeraPHYe chiplet is capable of a data transfer rate of 100 Tbps or more.

Figure 1:
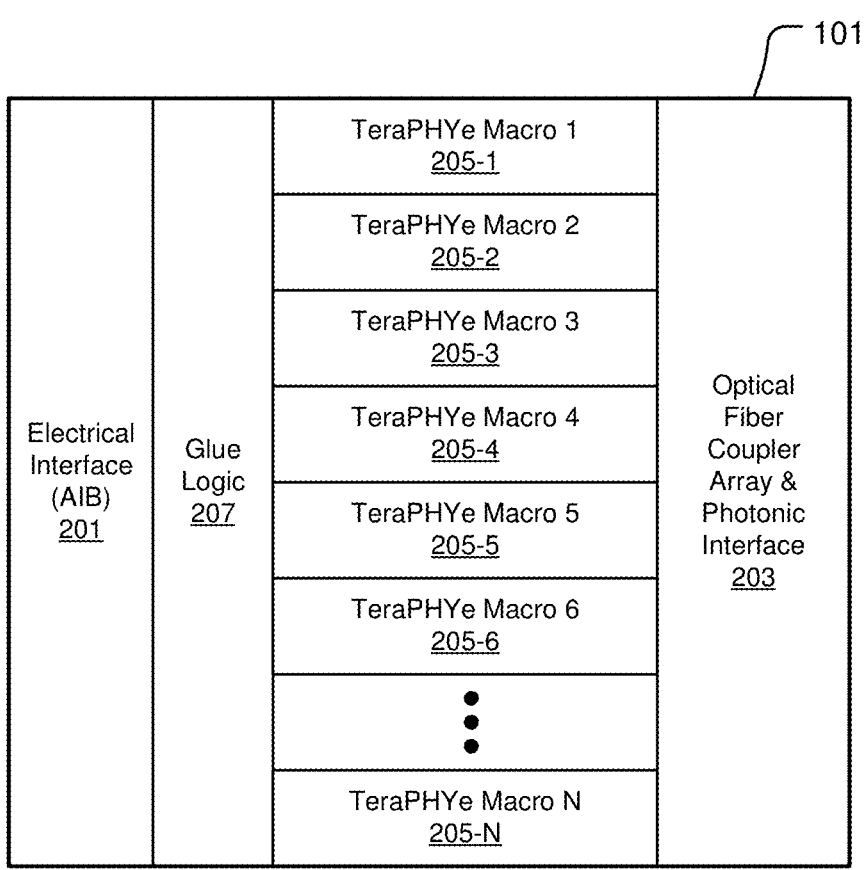
FIG. 1 shows an example organizational diagram of a TeraPHYe optical I/O chiplet, in accordance with some embodiments.

FIG. 1 shows an example organizational diagram of the TeraPHYe optical I/O chiplet 101, in accordance with some embodiments. The organizational diagram has an electrical interface 201 separated (split) from a photonic interface 203. The photonic interface 203 is configured to optically couple with a corresponding fiber array unit (FAU) 501 (see FIG. 5). In the example of FIG. 1, the electrical interface 201 is on a left side of the TeraPHYe optical I/O chiplet 101, and the photonic interface 203 (for the FAU 501) is on a right side of the TeraPHYe optical I/O chiplet 101. A number (1 to N) of optical macros 205-1 to 205-N are located between the photonic interface 203 and the electrical interface 201. The electrical interface 201 is connected to the optical macros 205-1 to 205-N by glue logic 207. The electrical interface 201 of the TeraPHYe optical I/O chiplet 101 is adaptable to the logic of an integrated circuit chip to which the TeraPHYe optical I/O chiplet 101 connects. In the example of FIG. 1, the flow of data from electronics-to-optics is from left-to-right. Conversely, in the example of FIG. 1, the flow of data from optics-to-electronics is from right-to-left. In other embodiments, the layout of the TeraPHYe optical I/O chiplet 101 is reversed such that the photonic interface 203 is on the left side and the electrical interface 201 is on the right side, with the glue logic 207 disposed between the electrical interface and the optical macros 205-1 to 205-N. In this reversed layout configuration of the TeraPHYe optical I/O chiplet 101, the flow of data from electronics-to-optics is from right-to-left, and the flow of data from optics-to-electronics is from left-to-right.

The electrical interface 201 is a block of circuitry configured to handle electrical I/O to and from the integrated circuit chip to which the TeraPHYe optical I/O chiplet 101 connects, such as an Ethernet switch chip/die, or other type of integrated circuit chip. The optical macros 205-1 to 205-N are responsible for conversion of data signals between the optical and electrical domains. Specifically, each of the optical macros 205-1 to 205-N is configured to convert electrical data signals received through the electrical interface 201 into optical data signals for transmission through the photonic interface 203. Also, each of the optical macros 205-1 to 205-N is configured to convert optical data signals received through the photonic interface 203 into electrical data signals for transmission through the electrical interface 201. The photonic interface 203 is responsible for coupling optical signals to and from the optical macros 205-1 to 205-N. The glue logic 207 enables flexible (dynamic or static) mapping of the electrical interface 201 to the optical macros 205-1 to 205-N and associated optical wavelengths. In this manner, the glue logic 207 (also called crossbar circuitry) provides dynamic routing of electrical signals between the optical macros 205-1 to 205-N and the electrical interface 201. The glue logic 207 also provides for retiming, rebuffering, and flit reorganization functions at the phy-level. Also, in some embodiments, the glue logic 207 implements various error correction and data-level link protocols to offload some processing from the integrated circuit chip to which the TeraPHYe optical I/O chiplet 101 connects.

Figure 2:
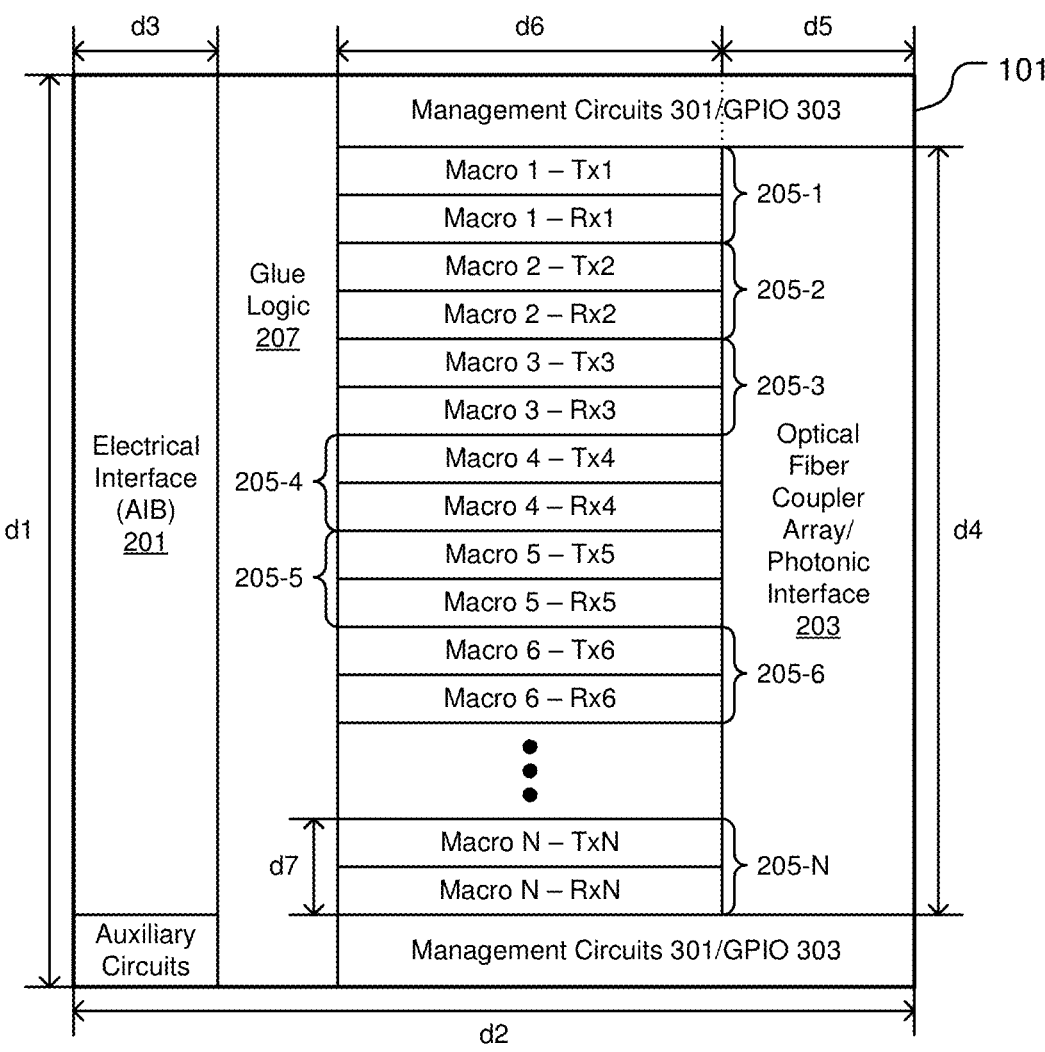
FIG. 2 shows an example layout of the TeraPHYe optical I/O chiplet of FIG. 1, in accordance with some embodiments.

FIG. 2 shows an example layout of the TeraPHYe optical I/O chiplet 101, in accordance with some embodiments. The layout of the optical and electrical components of the TeraPHYe optical I/O chiplet 101 is designed to optimize area efficiency, energy efficiency, performance, and practical considerations such as avoiding optical waveguide crossings. In some embodiments, the electrical interface 201 is laid out along one chip edge (e.g., left side edge in the example of FIG. 2), and the photonic interface 203 for optical coupling with the FAU 501 is laid out along the opposite chip edge (e.g., right side edge in the example of FIG. 2). In some embodiments, the photonic interface 203 includes an optical grating coupler for each of the optical fibers in the FAU 501. In various embodiments, the photonic interface 203 includes vertical optical grating couplers, edge optical couplers, and/or essentially any other type of optical coupling device, and/or combination thereof to enable optical coupling of the FAU 501 with the optical macros 205-1 to 205-N. In some embodiments, the photonic interface 203 is configured to interface with 24 optical fibers within the FAU 501. In some embodiments, the photonic interface 203 is configured to interface with 16 optical fibers within the FAU 501. The glue logic 207 routes data between the electrical interface 201 and the optical macros 205-1 to 205-N. The glue logic 207 includes cross-bar switches and other circuitry as needed to interface the electrical interface 201 connections with the optical macros 205-1 to 205-N. In some embodiments, the optical transmitters (Tx) and optical receivers (Rx) of the optical macros 205-1 to 205-N are combined in pairs, with each Tx/Rx pair forming an optical transceiver. The glue logic 207 enables dynamic mapping of electrical lanes/channels in the electrical interface 201 to optical lanes/channels in the optical macros 205-1 to 205-N. The optical macros 205-1 to 205-N (for data transmitting (Tx) and data receiving (Rx)) are laid out in between the glue logic 207 and the photonic interface 203 that couples with the FAU 501. The optical macros 205-1 to 205-N include both optical and electrical circuitry responsible for converting electrical signals to optical signals and for converting optical signals to electrical signals.

In some embodiments, the electrical interface 201 is configured to implement the Advanced Interface Bus (AIB) protocol to enable electrical interface between the TeraPHYe optical I/O chiplet 101 and one or more other integrated circuit chips. It should be understood, however, that in other embodiments the electrical interface 201 can be configured to implement essentially any electrical data communication interface other than AIB. For example, in some embodiments, the electrical interface 201 includes a High Bandwidth Memory (HBM) and Kandou Bus for serialization/deserialization of data.

In some embodiments, the TeraPHYe optical I/O chiplet 101 has a length d1 and a width d2, where d1 is about 8.9 millimeters (mm) and d2 is about 5.5 mm. It should be understood that the term "about," as used herein, means +/−10% of a given value. In some embodiments, the length d1 is less than about 8.9 mm. In some embodiments, the length d1 is greater than about 8.9 mm. In some embodiments, the width d2 is less than about 5.5 mm. In some embodiments, the width d2 is greater than about 5.5 mm. In some embodiments, the electrical interface 201 has a width d3 of about 1.3 mm. In some embodiments, the width d3 is less than about 1.3 mm. In some embodiments, the width d3 is greater than about 1.3 mm. In some embodiments, the photonic interface 203 for the optical fiber array has a length d4 of about 5.2 mm and a width d5 of about 2.3 mm. In some embodiments, the length d4 is less than about 5.2 mm. In some embodiments, the length d4 is greater than about 5.2 mm. In some embodiments, the width d5 is less than about 2.3 mm. In some embodiments, the width d5 is greater than about 2.3 mm. In some embodiments, the optical macros 205-1 to 205-N have a width d6 of about 1.8 mm. In some embodiments, the width d6 is less than about 1.8 mm. In some embodiments, the width d6 is greater than about 1.8 mm. In some embodiments, each transmitter Tx and receiver Rx optical macro 205-1 to 205-N pair has a length d7 of about 0.75 mm. In some embodiments, the length d7 is less than about 0.75 mm. In some embodiments, the length d7 is greater than about 0.75 mm. In some embodiments, the transmitter Tx and receiver Rx optical macros 205-1 to 205-N are positioned to align with an optical fiber pitch within the photonic interface 203. In some embodiments, the length d7 of each optical macro 205-1 to 205-N (pair of transmitter (Tx) and receiver (Rx) optical macros) is matched to the pitch of the optical fibers in an optical fiber ribbon. For example, if the optical fiber pitch is 250 micrometers in the optical fiber ribbon, and three of the optical fibers in the optical fiber ribbon correspond to one of the optical macros 205-1 to 205-N (e.g., one optical fiber brings continuous wave light to the transmitter (Tx) optical macro from a laser, one optical fiber transmits data as modulated light from the transmitter (Tx) optical macro, and one optical fiber brings modulated light carrying encoded data to the receiver (Rx) optical macro), then the optical macro length d7 is 750 micrometers.

In some embodiments, the number N of optical macros 205-1 to 205-N is 8. In some embodiments, the number N of optical macros 205-1 to 205-N is less than 8. In some embodiments, the number N of optical macros 205-1 to 205-N is greater than 8. Also, each of the optical macros 205-1 to 205-M represents an optical port. In some embodiments, a dual phase lock loop (PLL) circuit is shared by each transmitter Tx/receiver Rx pair within the optical macros 205-1 to 205-N. In some embodiments, the dual PLL includes a PLLU that covers a frequency range from 24 gigaHertz (GHz) to 32 GHz, and a PLLD that covers a frequency range from 15 GHz to 24 GHz.

The TeraPHYe optical I/O chiplet 101 also includes management circuits 301 and general purpose input/output (GPIO) components 303 for communicating electrical data signals to and from the TeraPHYe optical I/O chiplet 101. In various embodiments, the GPIO components 303 include Serial Peripheral Interface (SPI) components and/or another type of component to enable off-chip data communication. Also, in some embodiments, the TeraPHYe optical I/O chiplet 101 includes many other circuits, such as memory (e.g., SRAM), a CPU, analog circuits, and/or any other circuit that is implementable in CMOS.

Figure 3:
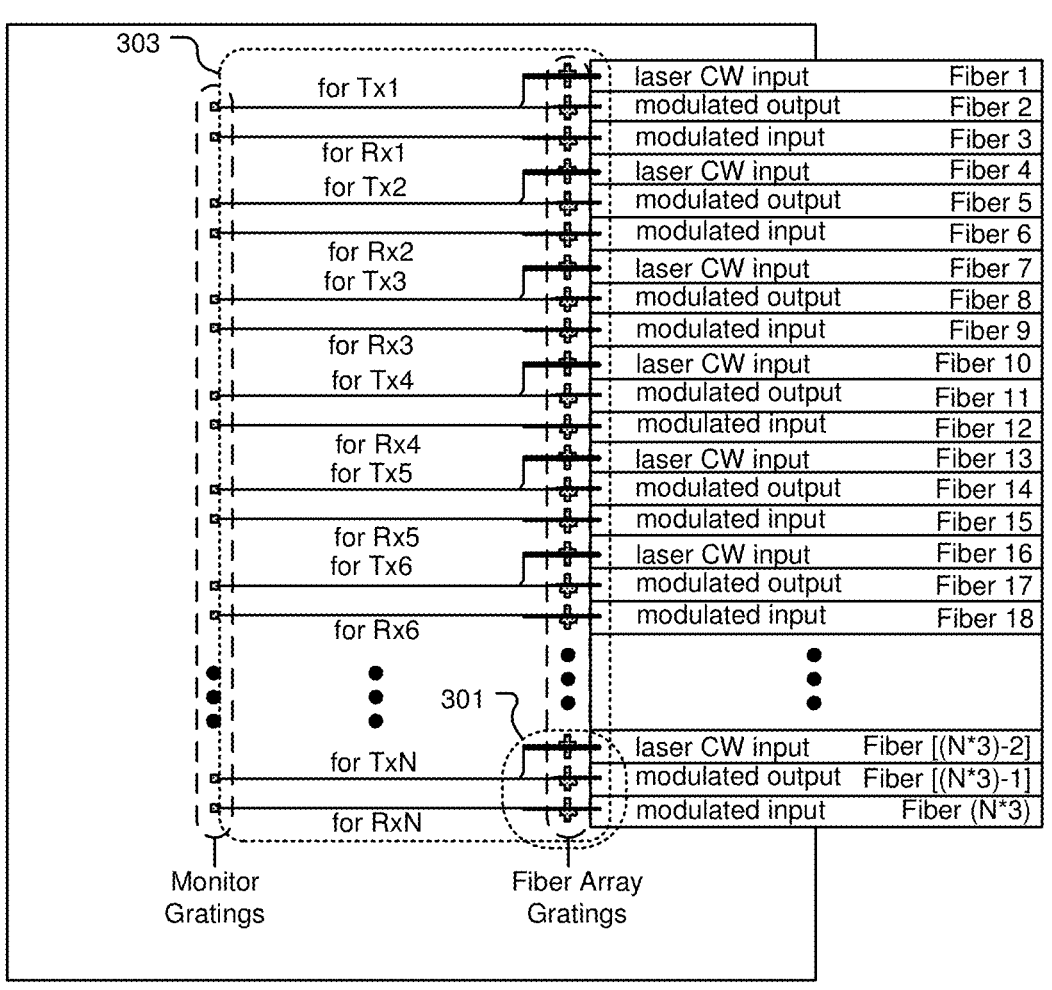
FIG. 3 shows an example layout of photonic structures of the TeraPHYe optical I/O chiplet of FIG. 1, in accordance with some embodiments.

FIG. 3 shows an example layout of photonic structures of the TeraPHYe optical I/O chiplet 101, in accordance with some embodiments. FIG. 3 shows some optical waveguides 303 and associated optical grating structures 301 of the optical layout of the TeraPHYe optical I/O chiplet 101, but some portions of the optical layout such as optical microring resonators and associated electronics are not shown in order to avoid obscuring the optical layout. The example floorplan of the TeraPHYe optical I/O chiplet 101 in FIG. 3 has the optical fibers (1 to N*3) coming in on the right side of the TeraPHYe optical I/O chiplet 101. Light is coupled from the optical fibers into the optical fiber grating couplers 301 on the TeraPHYe optical I/O chiplet 101 and/or from the optical fiber grating couplers 301 into the optical fibers. The light coupled into the optical grating couplers 301 is guided by the optical waveguides 303 to the inputs of the optical macros 205-1 to 205-N. Each optical macro 205-1 to 205-N has three optical fiber connections, including one optical fiber connection for the continuous wave laser light input to the optical transmitter (Tx input), one optical fiber connection for the optical output from the optical transmitter (Tx output), and one optical fiber connection for the modulated optical input to the optical receiver (Rx input).

In some embodiments, the optical layout shown in FIG. 3 uses single-polarization optical grating couplers 301 as the optical coupling structures from the optical fibers to the TeraPHYe optical I/O chiplet 101. In some embodiments, when the TeraPHYe optical I/O chiplet 101 uses dual-polarization inputs, the optical layout includes polarization splitting optical grating couplers 301 followed by an optical combiner structure. In some embodiments, when the Tera-PHYe optical I/O chiplet 101 uses dual-polarization inputs and the optical grating couplers 301 support both TE/TM polarization states, the optical layout includes a polarization splitter-rotator followed by an optical combiner structure, such that the optical waveguide interfaces (Tx input, Tx output, Rx input) to the optical macros 205-1 to 205-N have a single polarization. In these embodiments, the polarization splitter-rotator functions to rotate a first polarization component of the incoming light to a second polarization, such that all of the incoming light is of the second polarization when it is conveyed to the optical macros 205-1 to 205-N. For example, in some embodiments, the polarization splitter-rotator functions to rotate the TM polarization component of the incoming light to TE polarization, such that all of the incoming light is of the TE polarization when it is conveyed to the optical macros 205-1 to 205-N. Alternatively, in some embodiments, the polarization splitter-rotator functions to rotate the TE polarization component of the incoming light to TM polarization, such that all of the incoming light is of the TM polarization when it is conveyed to the optical macros 205-1 to 205-N. In various embodiments, the optical layout of FIG. 3 is mirrored, rotated, or both mirrored and rotated. Also, in some embodiments, the optical fiber coupler array 203 organization of the TeraPHYe optical I/O chiplet 101 includes optical edge couplers based on mode converters, V-grooves, and/or other optical fiber coupling mechanisms.

Figure 4:
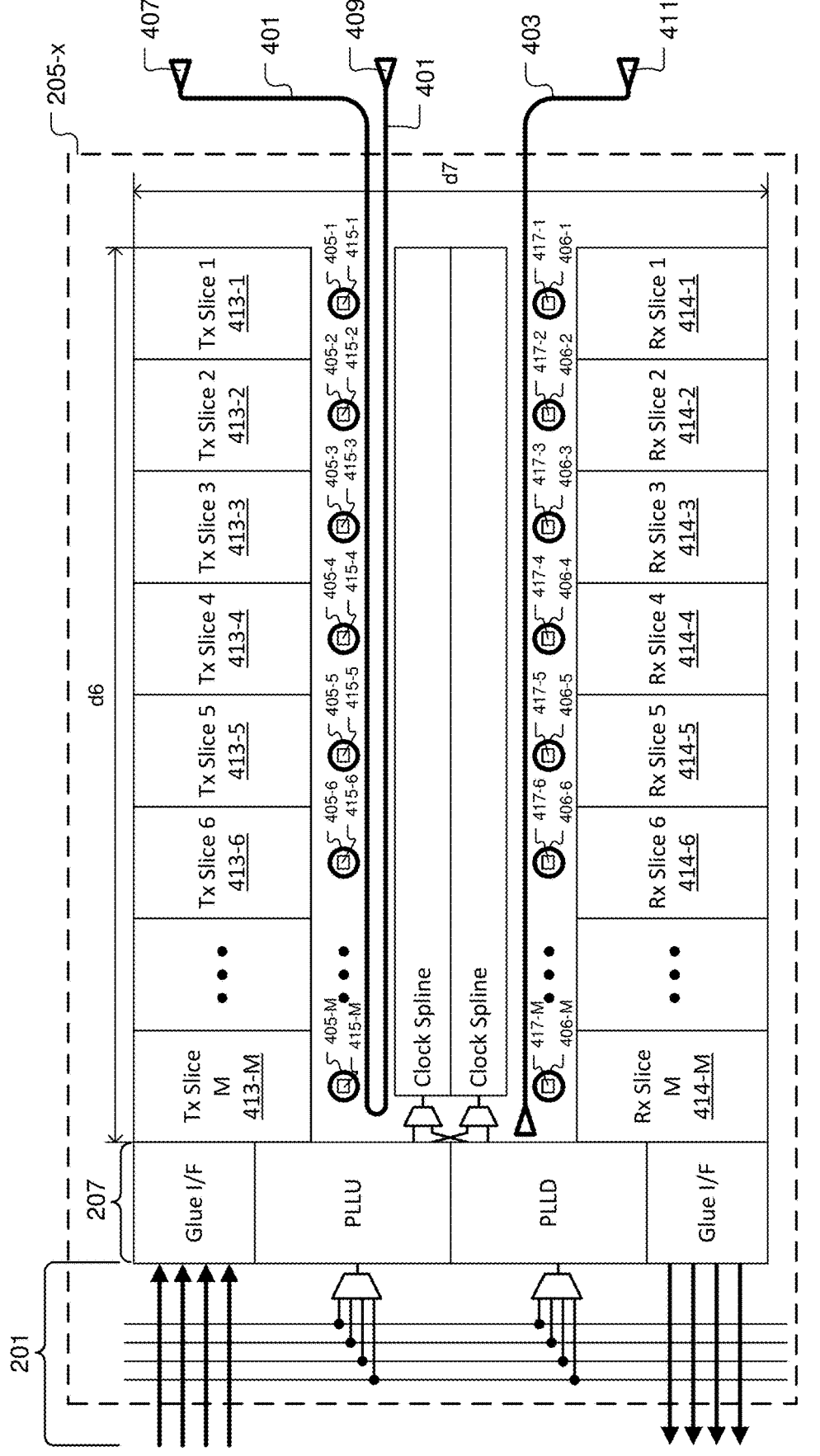
FIG. 4 shows an example layout of a given one of the optical macros within the TeraPHYe optical I/O chiplet of FIG. 1, in accordance with some embodiments.

FIG. 4 shows an example layout of a given one of the optical macros 205-1 to 205-N, referred to as optical macro 205-x, in accordance with some embodiments. The optical macro 205-x includes a number M of transmit (Tx) slices 413-1 to 413-M and the number M of receive (Rx) slices 414-1 to 414-M. An optical slice of the optical macro 205-x refers to either a single one of the optical transmitter slices 413-1 to 413-M, or a single one of the optical receiver slices 414-1 to 414-M, or a combination of a single one of the optical transmitter slices 413-1 to 413-M and a corresponding single one of the optical receiver slices 414-1 to 414-M, where the single one of the optical transmitter slices 413-1 to 413-M and the single one of the optical receiver slices 414-1 to 414-M operates using a single (same) wavelength of light. The example layout of FIG. 4 shows the routing of an optical waveguide 401 and the placement of optical microring resonators 405-1 to 405-M within the transmit (Tx) portion of the optical macro 205-x. The microring resonators 405-1 to 405-M function as modulators. The example layout of FIG. 4 also shows the routing of an optical waveguide 403 and the placement of optical microring resonators 406-1 to 406-M within the receive (Rx) portion of the optical macro 205-x. The microring resonators 406-1 to 406-M function as photodetectors. In some embodiments, one or more of the microring resonators 405-1 to 405-M and 406-1 to 406-M is/are controlled to function as an optical multiplexer and/or as an optical demultiplexer.

In some embodiments, each of the microring resonators 405-1 to 405-M and 406-1 to 406-M is configured as either a disc-shaped structure or as an annular ring-shaped structure. In some embodiments, each of the microring resonators 405-1 to 405-M and 406-1 to 406-M has a substantially circular outer diameter of less than or equal to about 50 micrometers. In some embodiments, each of the microring resonators 405-1 to 405-M and 406-1 to 406-M has a substantially circular outer diameter of less than or equal to about 30 micrometers. In some embodiments, each of the microring resonators 405-1 to 405-M and 406-1 to 406-M has a substantially circular outer diameter of less than or equal to about 10 micrometers.

Each corresponding pair of the transmit (Tx) slices 413-1 to 413-M and the receive (Rx) slices 414-1 to 414-M forms a slice of the optical macro 205-x. For example, Tx Slice 1 413-1 and Rx Slice 1 414-1 together form a Slice 1 of the optical macro 205-x. The transmit (Tx) slices 413-1 to 413-M include electrical circuitry for directing translation of electrical data in the form of a bit stream into a stream of modulated light by operating the microring resonators 405-1 to 405-M, respectively, to modulate the continuous wave laser light incoming through the optical waveguide 407 at a given wavelength into a stream of modulated light at the given wavelength. The receive (Rx) slices 414-1 to 414-M include electrical circuitry for detecting light of a given wavelength within a stream of modulated light incoming through the optical waveguide 403 by operating the microring resonators 406-1 to 406-M, respectively. In some embodiments, the each of the microring resonators 406-1 to 406-M includes a built-in photodetector device. In some embodiments, each of the microring resonators 406-1 to 406-M couples light into a respective photodetector device formed outside of the microring resonators 406-1 to 406-M. The electrical circuitry within the receive (Rx) slices 414-1 to 414-M translate the light that is detected by operation of the microring resonators 406-1 to 406-M at a corresponding wavelength into a bit stream in the electrical domain.

The optical waveguide 401 routes continuous wave laser light from an optical input 407 to each of the microring resonators 405-1 to 405-M within the transmit (Tx) slices 413-1 to 413-M. The optical waveguide 401 also routes modulated light from the microring resonators 405-1 to 405-M within the transmit (Tx) slices 413-1 to 413-M to an optical output 409. In some embodiments, each of the microring resonators 405-1 to 405-M within the transmit (Tx) slices 413-1 to 413-M is tunable to operate at a specified wavelength of light. Also, in some embodiments, the specified wavelength of light at which a given microring resonator 405-x is tuned to operate is different than the specified wavelengths at which the other microring resonators 405-1 to 405-M, excluding 405-x, are tuned to operate. In some embodiments, heating devices 415-1 to 415-M are positioned near the microring resonators 405-1 to 405-M, respectively, to provide for thermal tuning of the resonant wavelength of the microring resonators 405-1 to 405-M. In some embodiments, each of the microring resonators 405-1 to 405-M and/or heating devices 415-1 to 415-M is connected to corresponding electrical tuning circuitry that is operated to electrically tune the resonant wavelengths of the microring resonators 405-1 to 405-M.

The optical waveguide 403 routes incoming modulated light from an optical input 411 to the microring resonators 406-1 to 406-M within the receive (Rx) slices 414-1 to 414-M. In some embodiments, each of the microring resonators 406-1 to 406-M within the receive (Rx) slices 414-1 to 414-M is tunable to operate at a specified wavelength of light. Also, in some embodiments, the specified wavelength of light at which a given microring resonator 406-x is tuned to operate is different than the specified wavelengths at which the other microring resonators 406-1 to 406-M, excluding 406-x, are tuned to operate. In some embodiments, heating devices 417-1 to 417-M are positioned near the microring resonators 406-1 to 406-M, respectively, to provide for thermal tuning of the resonant wavelength of the microring resonators 406-1 to 406-M. In some embodiments, each of the microring resonators 406-1 to 406-M and/or heating devices 417-1 to 417-M is connected to corresponding electrical tuning circuitry that is operated to electrically tune the resonant wavelength of the microring resonators 406-1 to 406-M.

In some embodiments, the architecture and floorplan of the optical macro 205-x is variable by including a different number of PLLs at various positions within the optical macro 205-x. For example, in some embodiments, a centralized PLL is positioned within the clock spine and fans out to the slices at both sides of the optical macro 205-x. In various embodiments, the PLL is replicated as multiple PLL instances across the optical macro 205-x, with each PLL instance either dedicated to a given transmit (Tx)/receive (Rx) slice or shared with a subset of transmit (Tx)/receive (Rx) slices. In various embodiments, other floorplan configurations of the optical macro 205-x include multiple columns of optical macros with pass-through photonic rows, to increase the edge bandwidth density, and/or staggering of the transmit (Tx) and receive (Rx) optical macros side-by-side to increase the edge bandwidth density.

The optical macro 205-x includes both photonic and electronic components. The optical waveguides 401 and 403 in the optical macro 205-x are laid out so as to avoid optical waveguide crossings and so as to minimize optical waveguide length, which minimizes optical losses, and correspondingly improves the energy efficiency of the system. The optical macro 205-x is laid out in such a way as to minimize the distance between the electronic components and the optical components in order to minimize electrical trace length, which improves the energy efficiency of the optical macro 205-x, enables faster signal transmission, and reduces chip size.

The TeraPHYe optical I/O chiplet 101 includes the set of (N) optical macros 205-1 to 205-N. Each optical macro 205-x in the set of (N) optical macros 205-1 to 205-N includes the set of (M) optical transmitter slices 413-1 to 413-M and optical receiver slices 414-1 to 414-M that are logically grouped together to transmit or receive bits on a number (W) of different optical wavelengths on the respective optical waveguide 401, 403. In various embodiments, the number (M) of optical transmitter slices 413-1 to 413-M and optical receiver slices 414-1 to 414-M and the number (W) of different optical wavelengths can be defined as needed, considering that any number of optical transmitter slices 413-1 to 413-M and/or optical receiver slices 414-1 to 414-M is tunable to a given one of the number (W) of optical wavelengths. However, if data bits are being transmitted or received by multiple ones of the optical microring resonators 405-1 to 405-M, or by multiple ones of the optical microring resonators 406-1 to 406-M, tuned to the same optical wavelength, channel/wavelength contention is managed. The floorplan and organization of the optical macro 205-x represent adjustable degrees of freedom for controlling the following metrics: a) optical waveguide 401, 403 length, which directly correlates with optical loss; b) optical macro 205-x area, which correlates with manufacturing cost; c) optical macro 205-x area, which correlates with manufacturing cost; d) energy consumed per bit, which correlates with energy efficiency; e) electrical signaling integrity, which correlates with performance; f) electrical package escape representing the amount of electrical data input and output that is physically available for a given set of chip dimensions and for a given spacing/pitch of electrical bumps; and g) optical package escape representing the amount of optical data input and output that is physically available for a given set of chip dimensions and for a given spacing/pitch of optical fibers.

Figure 5:
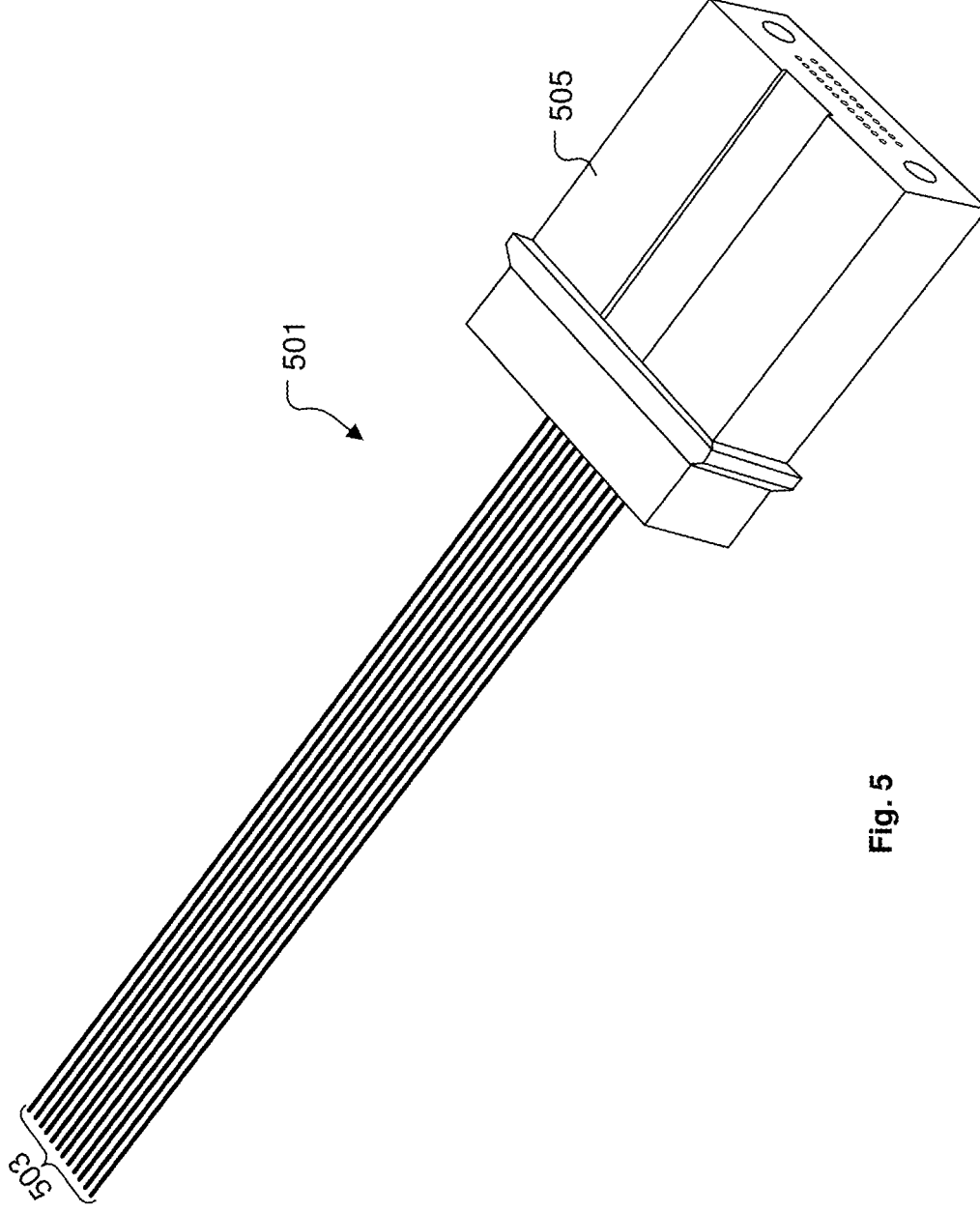
FIG. 5 shows an example fiber array unit for connection to the TeraPHYe optical I/O chiplet of FIG. 1, in accordance with some embodiments.

FIG. 5 shows an example FAU 501 for connection to the TeraPHYe optical I/O chiplet 101, in accordance with some embodiments. In some embodiments, the FAU 501 connects multiple optical fibers to the TeraPHYe optical I/O chiplet 101. In some embodiments, the FAU 501 includes an optical fiber pigtail 503 that includes multiple optical fibers that connect to the optical fiber coupler array 203 of the Tera-PHYe optical I/O chiplet 101. In some embodiments, some of the optical fibers within the optical fiber pigtail 503 are polarization maintaining single mode optical fibers (PMF), such as used for carrying continuous wave laser light from an external laser device to the TeraPHYe optical I/O chiplet 101. Also, in some embodiments, some of the optical fibers within the optical fiber pigtail 503 are non-polarization maintaining single mode optical fibers (SMF) for carrying modulated light signals to and/or from the TeraPHYe optical I/O chiplet 101. In some embodiments, the FAU 501 includes a mechanical transfer (MT) ferrule 505, such as an MTP® connector. In some embodiments, the FAU 501 is configured to connect up to 24 optical fibers to the TeraPHYe optical I/O chiplet 101. For example, in some embodiments, the MT ferrule 505 is configured as a 2×12 MTP® connector ferrule.

In some embodiments, the TeraPHYe optical I/O chiplet 101 has a coarse wavelength division multiplexing 4-lane (CWDM4) configuration in which each of the optical macros 205-1 to 205-M includes four serializer/deserializer (SerDes) slices (FR-4) or eight SerDes slices (FR-8). In some embodiments, the optical macros 205-1 to 205-M are divided into wavelength transmit (Tx)/receive (Rx) slices, with each Tx/Rx slice including fully integrated analog Tx/Rx front-ends, serialization/deserialization, clock-data-recovery, and microring resonator thermal tuning digital control. In some embodiments, the photonic components integrated in each Tx/Rx slice/optical macro 205-x optical port are based on microring resonators (such as modulators, filters, etc.). In some embodiments, the TeraPHYe optical I/O chiplet 101 optically couples to the FAU 501 through edge-coupled V-groove structures with embedded mode-converters.

Figure 6:
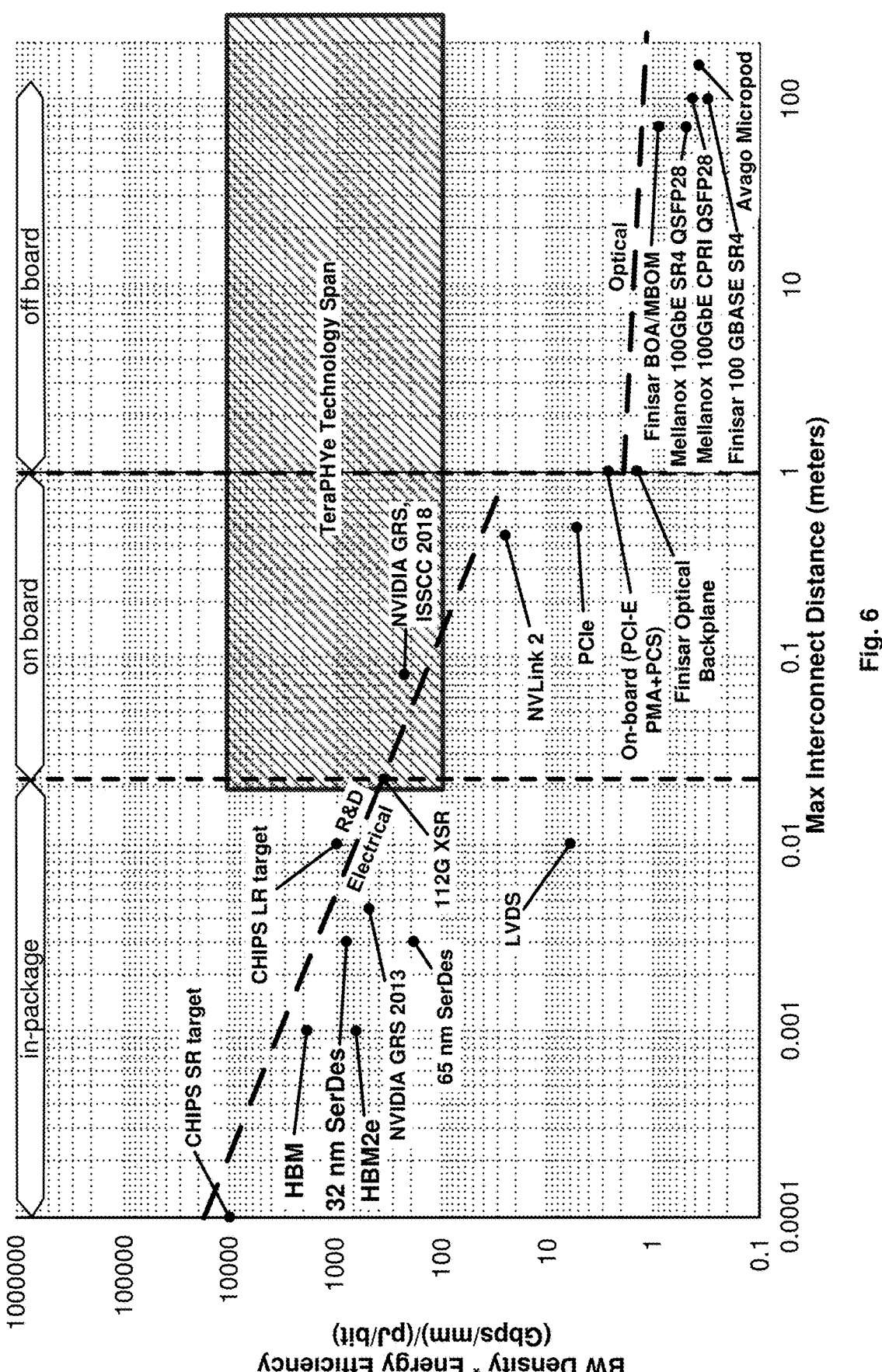
FIG. 6 shows where the TeraPHYe MIPO I/O chiplet wavelength division multiplexing technology resides within a plot of a product of energy efficiency and bandwidth density versus maximum interconnect span (data communication reach) for various interconnect technologies, in accordance with some embodiments.

FIG. 6 shows where the TeraPHYe MIPO I/O chiplet 101 wavelength division multiplexing (WDM) technology resides within a plot of a product of energy efficiency and bandwidth density in units of Gigabit per second per millimeter divided by picojoule per bit [(Gbps/mm)/(pJ/bit)] versus maximum interconnect span (data communication reach) in units of meters (m) for various interconnect technologies, in accordance with some embodiments. FIG. 6 shows that the TeraPHYe MIPO I/O chiplet 101 WDM technology is capable of providing communication over distances of a several kilometers (km) at the bandwidth-density and energy-cost of in-package interconnects. FIG. 6 also shows various technology metrics and comparison of the TeraPHYe MIPO I/O chiplet 101 WDM technology with existing electrical and optical technologies. In this manner, FIG. 6 shows an example of where the TeraPHYe MIPO I/O chiplet 101 WDM technology capability is relevant. FIG. 6 shows that the TeraPHY MIPO I/O chiplet 101 WDM technology enables an off-package data communication reach of more than two km with power, bandwidth, and latency properties similar to an in-package electrical inter-connect. The TeraPHYe MIPO I/O chiplet 101 integrates tens of millions of transistors and hundreds of optical devices to provide multiple Tbps of I/O bandwidth off of a single CMOS chiplet. Monolithic integration of transistors with optical devices, such as microring resonators, enables seamless insertion of the TeraPHYe MIPO I/O chiplet 101 into the CMOS multi-chip packaging ecosystems, while at the same time enabling a flexible electrical interface toward a host system-on-chip (SoC).

Figure 7:
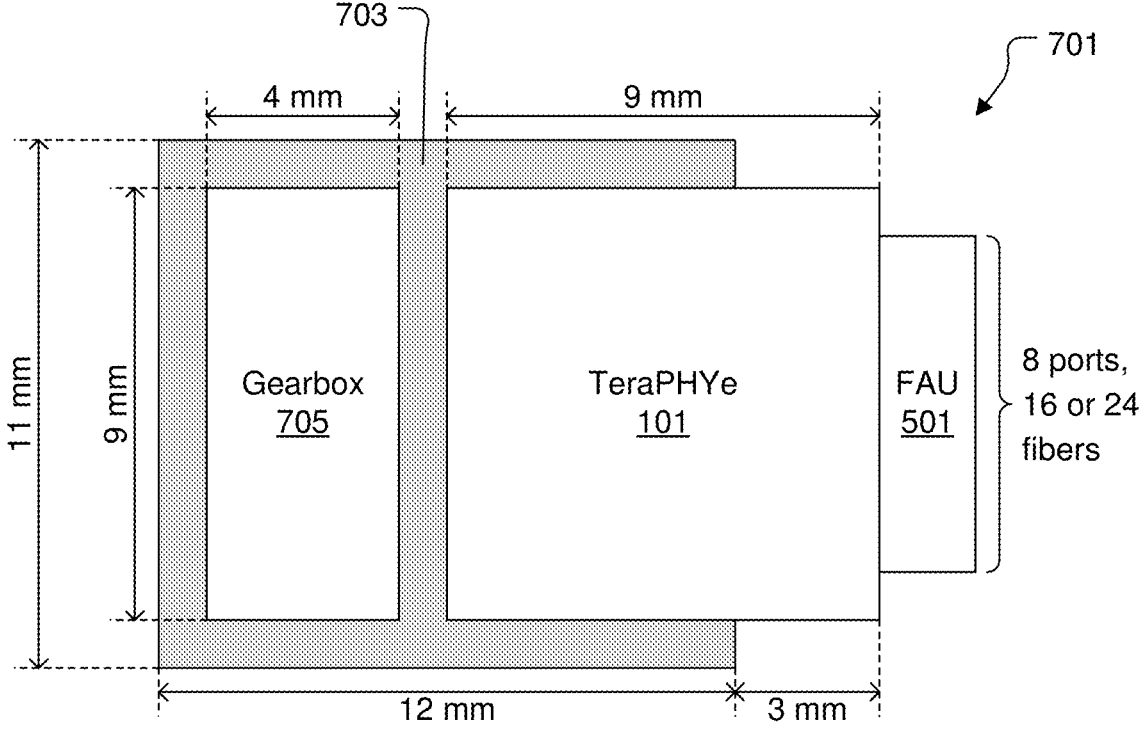
FIG. 7 shows a diagram of a TeraPHYe pod that includes the TeraPHYe MIPO I/O chiplet of FIG. 1, in accordance with some embodiments.

FIG. 7 shows a diagram of a TeraPHYe pod 701 that includes the TeraPHYe MIPO I/O chiplet 101, in accordance with some embodiments. The TeraPHYe pod 701 includes a substrate 703 onto which the TeraPHYe MIPO I/O chiplet 101 is mounted. In some embodiments, the substrate 703 is a 2.5D integration substrate. However, in other embodiments, the substrate 703 can be another type of integration substrate. In some embodiments, the substrate 703 is a silicon (Si) interposer substrate. In some embodiments, the substrate 703 is an optically-enhanced wafer-level fanout (O-WLFO) substrate. The TeraPHYe pod 701 also includes a Gearbox chiplet 705 mounted to the substrate 703. The Gearbox chiplet 705 performs conversion between a serial interface of a switch chip/die to which the TeraPHYe MIPO I/O chiplet 101 connects, e.g., extra short reach (XSR) or ultra short reach (USR) serial interface, and the wide-parallel interface of the TeraPHYe MIPO I/O chiplet 101, e.g., AIB or high-bandwidth interconnect (HBI) interface. In some embodiments, the Gearbox chiplet 705 is a bulk CMOS chiplet designed in a 7 nanometer (nm) or 12 nm process node. However, in other embodiments, the Gearbox chiplet 705 is an integrated circuit device designed and fabricated in a CMOS process node other than 7 nm or 12 nm. The TeraPHYe pod 701 also includes the FAU 501 attached to the TeraPHYe MIPO I/O chiplet 101.

In an example embodiment, a photonic chip pod (e.g., 701) is disclosed. The photonic chip pod includes a substrate (e.g., 703), a photonic input/output chiplet (e.g., 101) attached to the substrate, and a gearbox chiplet (e.g., 705) attached the substrate. In some embodiments, the substrate is either a 2.5D integration substrate, a silicon interposer substrate, or an optically-enhanced wafer-level fanout substrate. The photonic input/output chiplet includes a parallel electrical interface (e.g., 201), a photonic interface (e.g., 203), and a plurality of optical macros (e.g., 205-1 to 205-N) implemented between the photonic interface and the parallel electrical interface. In some embodiments, the parallel electrical interface of the photonic input/output chiplet is either an advanced interface bus (AIB) interface or a high-bandwidth interconnect (HBI) interface. In some embodiments, the photonic interface of the photonic input/output chiplet includes a plurality of optical alignment structures (e.g., v-grooves) configured to respectively receive and position a plurality of optical fibers for respective optically coupling with a plurality of optical grating couplers (e.g., 301) formed within the photonic input/output chiplet. Also, in some embodiments, each of the plurality of optical macros of the photonic input/output chiplet includes a plurality of optical microring resonators (e.g., 405-1 to 405-M and/or 406-1 to 406-M), where each optical microring resonator of the plurality of optical microring resonators has an outer diameter of less than or equal to about 10 micrometers. The gearbox chiplet is attached to the substrate in electrical connection with the parallel electrical interface of the photonic input/output chiplet. The gearbox chiplet is configured to provide conversion between the parallel electrical interface of the photonic input/output chiplet and a serial electrical interface of another chip. In some embodiments, the serial electrical interface of the other chip is either an extra short reach (XSR) serial interface or an ultra short reach (USR) serial interface.

Figure 8:
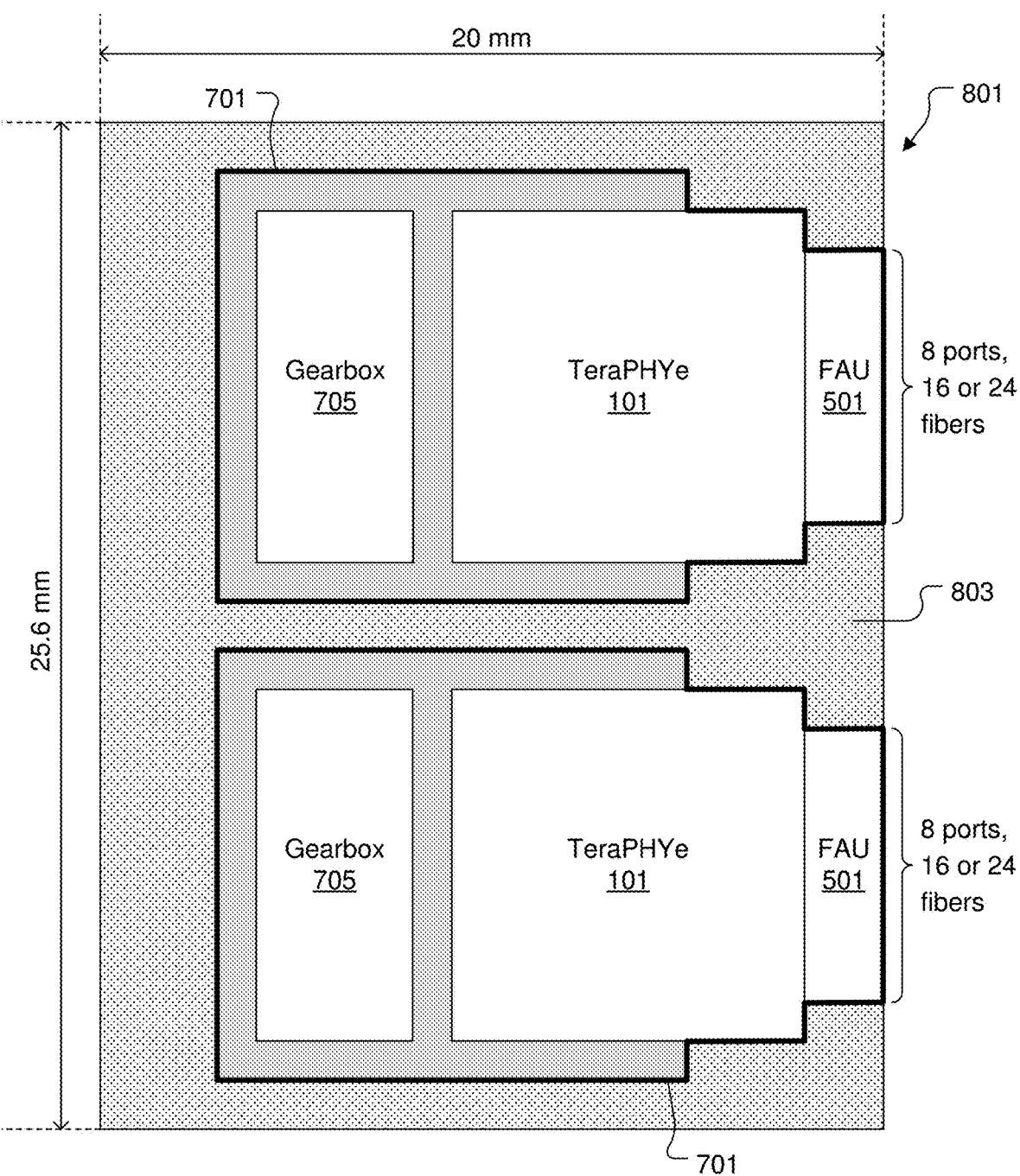
FIG. 8 shows a diagram of a TeraPHYe module that includes two of the TeraPHYe pods of FIG. 7 mounted on a substrate, in accordance with some embodiments.

FIG. 8 shows a diagram of a TeraPHYe module 801 that includes two of the TeraPHYe pods 701 mounted on an organic substrate 803, in accordance with some embodiments. In some embodiments, the organic substrate 803 is an organic high-density build-up (HDBU) substrate. In some embodiments, the TeraPHYe module 801 is a TeraPHYe 6.4T module that includes two eight-port TeraPHYe pods 701 mounted on the organic substrate 803.

Figure 9:
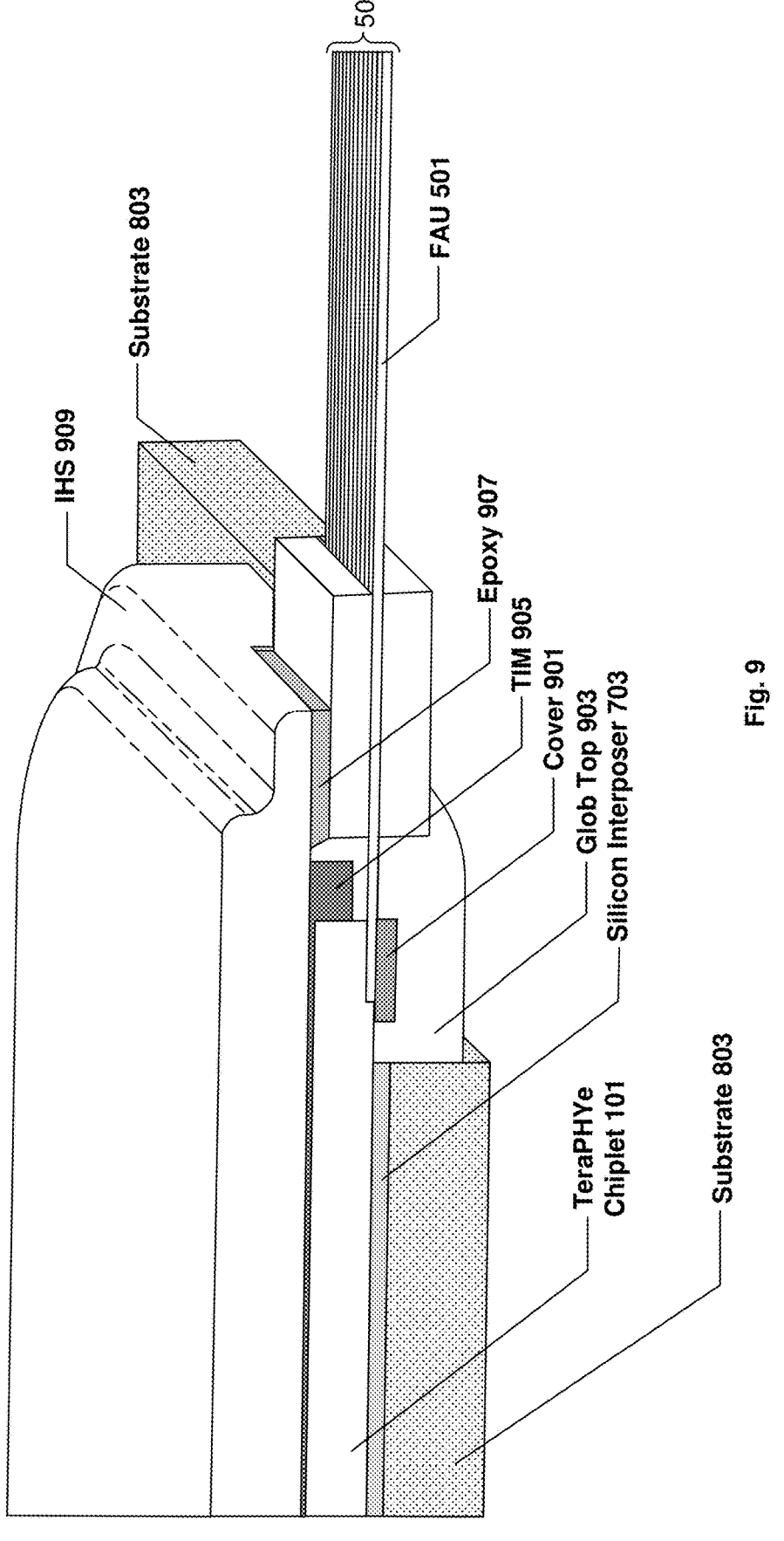
FIG. 9 shows a cross-sectional view through the Tera-PHYe module of FIG. 8 with the fiber array unit connected to the TeraPHYe MIPO I/O chiplet, in accordance with some embodiments.

FIG. 9 shows a cross-sectional view through the TeraPHYe module 801 with the FAU 501 connected to the TeraPHYe MIPO I/O chiplet 101, in accordance with some embodiments. FIG. 9 shows the TeraPHYe MIPO I/O chiplet 101 disposed on the silicon interposer (substrate) 703, with the silicon interposer (substrate) 703 disposed on the substrate 803. The optical fiber pigtail 503 of the FAU 501 is attached to the TeraPHYe MIPO I/O chiplet 101. In some embodiments, the optical fibers within the optical fiber pigtail 503 are positioned in optical alignment structures, such as V-grooves, formed within the TeraPHYe MIPO I/O chiplet 101, such that the optical fibers optically couple to corresponding optical grating couplers formed within the TeraPHYe MIPO I/O chiplet 101. In some embodiments, a cover structure 901 is positioned over the optical fibers and over the optical alignments structures formed within the TeraPHYe MIPO I/O chiplet 101 to protect the optical fibers and assist with holding the optical fibers in place. In some embodiments, a glob top material 903 is disposed over the cover structure 901. In some embodiments, the glob top material 903 is an adhesive, such as an epoxy or other suitable material. In some embodiments, an Integrated Heat Spreader (IHS) 909 is attached to a top surface of the substrate 803. In some embodiments, the IHS 909 serves as a lid structure. In some embodiments, a thermal interface material (TIM) 905 is disposed between the IHS 909 and the exposed upper surfaces of the TeraPHYe MIPO I/O chiplets 101 that are connected to the substrate 803. In various embodiments, the TIM 905 between the IHS 909 and the TeraPHYe MIPO I/O chiplets 101 is one or more of an epoxy, a polymer thermal interface material (PTIM), an elastomer, or another type of TIM 905. Also, in some embodiments, the IHS 909 functions as a structural support member to provide structural reinforcement to the substrate 803 and/or to portions of the TeraPHYe MIPO I/O chiplets 101 that are positioned to overhang the interposer 703 and substrate 803 within the fiber attach region. In some embodiments, the IHS 909 is formed of one or more material(s) having high thermal conductivity, such as aluminum, copper, tungsten, molybdenum, copper-tungsten alloy, copper-molybdenum alloy, aluminum-nitride, sintered aluminum-silicon carbide, magnesium-silicon carbide, sumicrystal, chemical vapor deposited diamond, copper-diamond, silver-diamond, and/or other similar heat spreader material. In some embodiments, the IHS 909 is secured to the substrate 803 by an epoxy material 907.

Figure 10:
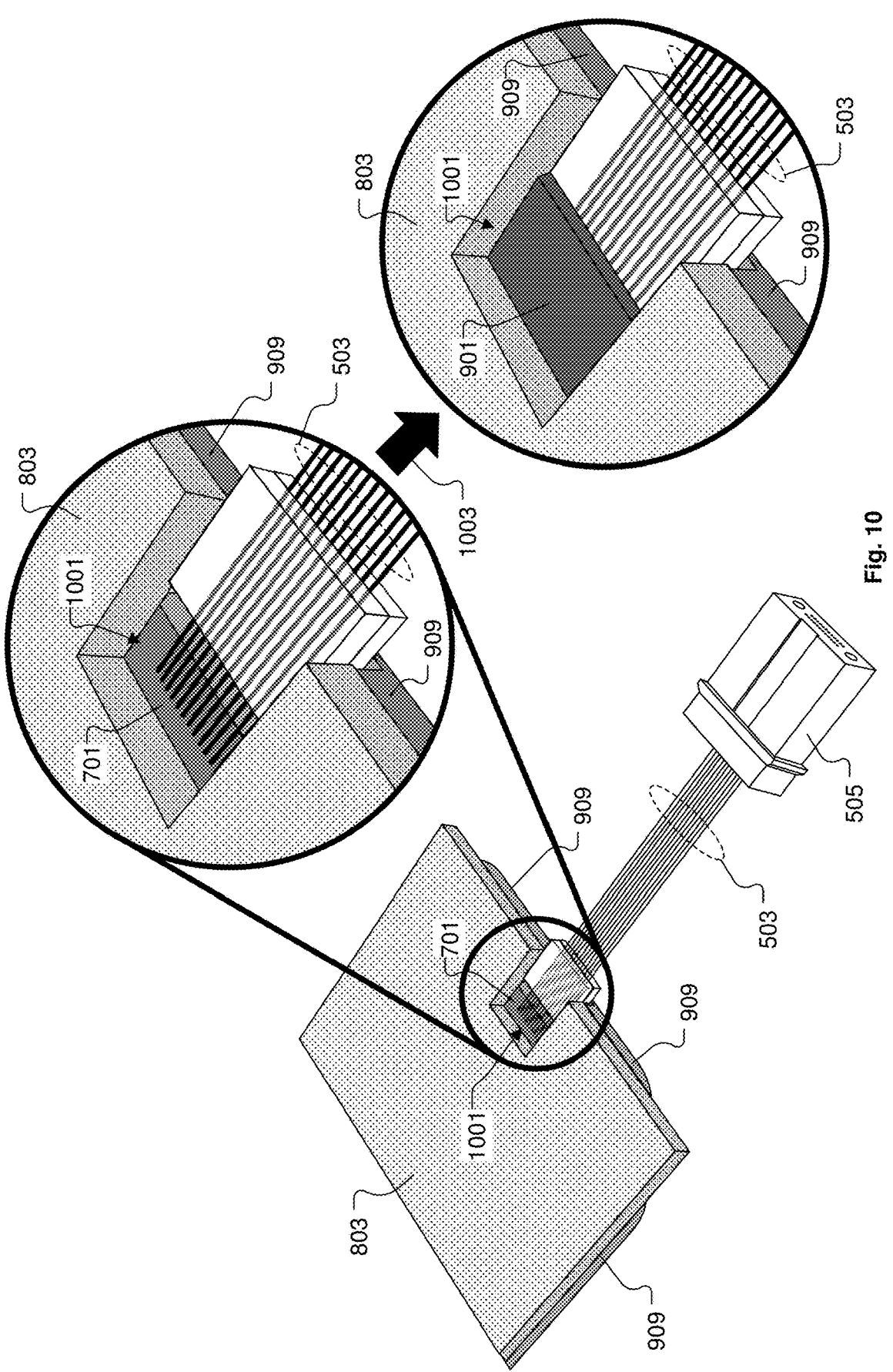
FIG. 10 shows the fiber array unit attached to one of the TeraPHYe MIPO I/O chiplets of the TeraPHYe module, as viewed from the substrate of the TeraPHYe module, in accordance with some embodiments.

FIG. 10 shows the FAU 501 attached to one of the TeraPHYe MIPO I/O chiplets 101 of the TeraPHYe module 801, as viewed from the substrate 803 of the TeraPHYe module 801, in accordance with some embodiments. As shown in FIG. 10, the substrate includes a cutout region 1001 for the FAU 501 for each of the TeraPHYe MIPO I/O chiplets 101. FIG. 10 also shows a close-up view of the optical fibers of the optical fiber pigtail 503 positioned in optical connection with the TeraPHYe MIPO I/O chiplet 101 before placement of the cover structure 901 on the optical fibers within the cutout region 1001. FIG. 10 also shows another close-up view of the cutout region 1001 for the FAU 501 after placement of the cover structure 901, as indicated by arrow 1003.

In an example embodiment, a photonic input/output module (e.g., 801) is disclosed. The photonic input/output module includes a module substrate (e.g., 803) and a plurality of photonic chip pods (e.g., 701) disposed on the module substrate. In some embodiments, the module substrate is an organic substrate. In some embodiments, the module substrate is a high-density build-up (HDBU) substrate. Each photonic chip pod of the plurality of photonic chip pods includes a pod substrate (e.g., 703), a photonic input/output chiplet (e.g., 101) attached to the pod substrate, and a gearbox chiplet (e.g., 705) attached the pod substrate. The photonic input/output chiplet includes a parallel electrical interface (e.g., 201), a photonic interface (e.g., 203), and a plurality of optical macros (e.g., 205-1 to 205-N) implemented between the photonic interface and the parallel electrical interface. The gearbox chiplet is attached the pod substrate in electrical connection with the parallel electrical interface of the photonic input/output chiplet. The gearbox chiplet is configured to provide conversion between the parallel electrical interface of the photonic input/output chiplet and a serial electrical interface of another chip.

Also, in some example embodiments, a plurality of fiber attach units (e.g., 501) are respectively connected to the photonic interfaces of the photonic input/output chiplets of the plurality of photonic chip pods. In some embodiments, the photonic interface of the photonic input/output chiplet includes a plurality of optical alignment structures (e.g., v-grooves) configured to respectively receive and position a plurality of optical fibers of a corresponding one of the plurality of fiber attach units for respective optical coupling of the plurality of optical fibers with a plurality of optical grating couplers (e.g., 301) formed within the photonic input/output chiplet, wherein the plurality of optical fibers of a given one of the plurality of fiber attach units is disposed within the plurality of optical alignment structures of the photonic input/output chiplet of a given one of the plurality of photonic chip pods.

Also, in some example embodiments, an outer periphery of the module substrate includes a plurality of cutout regions (e.g., 1001) respectively formed for the plurality of photonic chip pods, where a given one of the plurality of photonic chip pods is positioned on the module substrate so that the plurality of optical alignment structures of the photonic input/output chiplet of said given one of the plurality of photonic chip pods is positioned over a corresponding one of the plurality of cutout regions. In some example embodiments, a plurality of cover structures (e.g., 901) are respectively disposed within the plurality of cutout regions, where a given one of the plurality of cover structures is configured to cover a portion of the plurality of optical fibers of said given one of the plurality of fiber attach units that is disposed within the plurality of optical alignment structures of the photonic input/output chiplet of said given one of the plurality of photonic chip pods that is positioned over the corresponding one of the plurality of cutout regions, such as shown in FIG. 10. In some example embodiments, a glob top material is disposed within each of the plurality of cutout regions over the plurality of cover structures.

Also, in some example embodiments, an integrated heat spreader (e.g., 909) is attached to the module substrate. The integrated heat spreader is configured to extend over the plurality of photonic chip pods with an exposed surface of the photonic input/output chiplet of each of the plurality of photonic chip pods facing toward the integrated heat spreader. In some example embodiments, a thermal interface material (e.g., 905) is disposed between the integrated heat spreader and the photonic input/output chiplet of each of the plurality of photonic chip pods.

Figure 11:
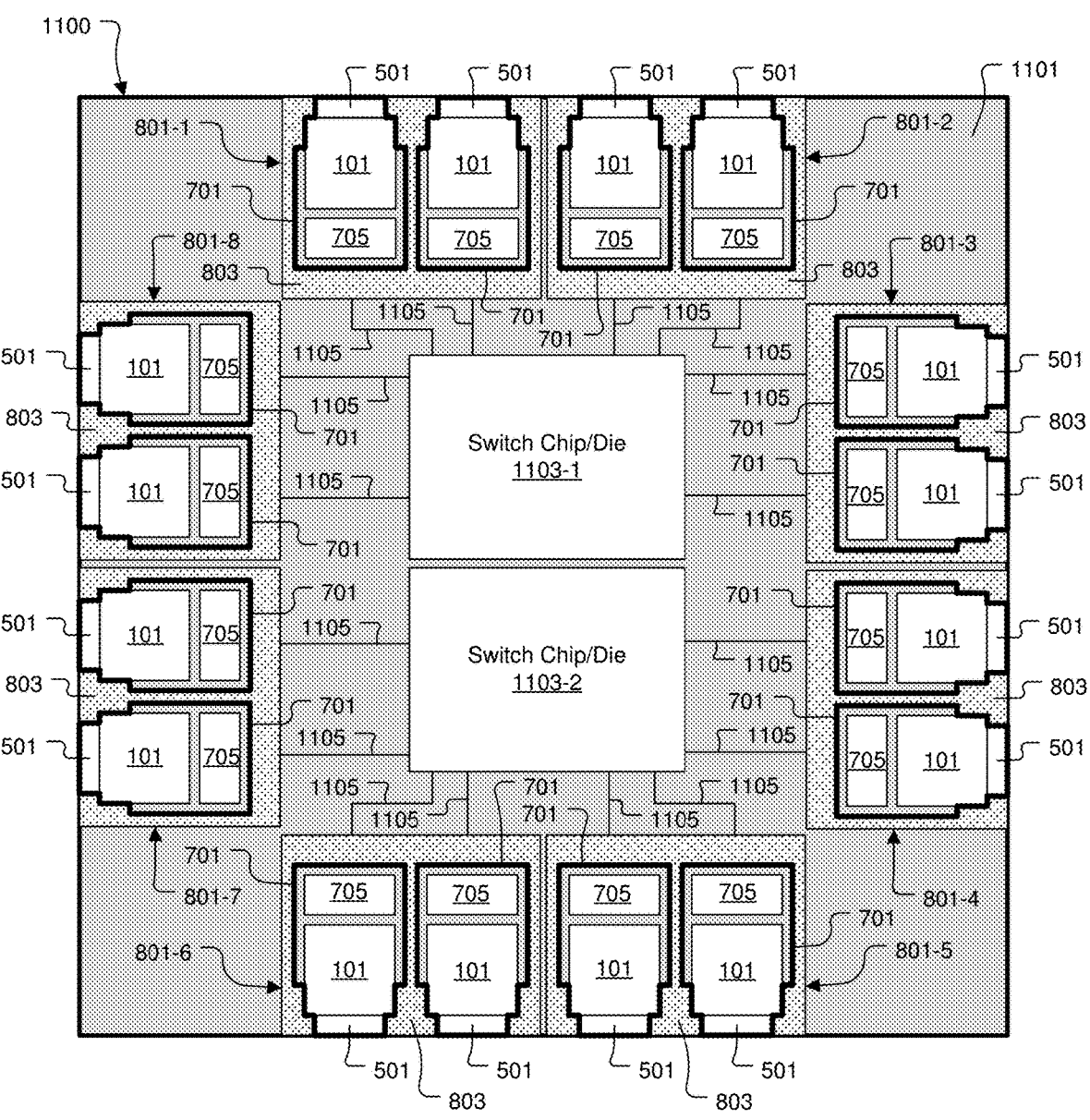
FIG. 11 shows a floorplan diagram of an Ethernet switch system-in-package solution that implements multiple instances of the TeraPHYe module of FIG. 8, in accordance with some embodiments.

FIG. 11 shows a floorplan diagram of an Ethernet switch system-in-package (SiP) 1100 solution that implements multiple instances of the TeraPHYe module 801, in accordance with some embodiments. The example Ethernet switch SiP 1100 includes eight TeraPHYe modules 801-1 to 801-8 disposed on a carrier substrate 1101, and two Ethernet switch chips/die 1103-1 and 1103-2 disposed on the carrier substrate 1101. The eight TeraPHYe modules 801-1 to 801-8 are positioned around the periphery of the carrier substrate 1101 with their respective FAU 501 facing toward a corresponding peripheral edge of the carrier substrate 1101. More specifically, in the example Ethernet switch SiP 1100, two instances of the TeraPHYe module 801 are positioned at each peripheral edge of the carrier substrate 1101. The two Ethernet switch chips/die 1103-1 and 1103-2 are positioned at the core (central location) of the carrier substrate 1101. In some embodiments, Ethernet switch SiP 1100 is a 2.5D assembly. In some embodiments, the carrier substrate 1101 is an embedded interconnect bridge (EMIB) substrate. In some embodiments, the carrier substrate 1101 is an optically-enabled wafer-level fanout (O-WLFO) substrate. In some embodiments, the carrier substrate 1101 is a thin-film on organic substrate. Also, in some embodiments, the Tera-PHYe modules 801-1 to 801-8 are FR4 modules.

In some embodiments, the Ethernet switch SiP 1100 is a 50 Tbps Ethernet switch with 200 Gbps/400 Gbps per port. In some embodiments, each FAU 501 connects 24 optical fibers to a corresponding TeraPHYe MIPO I/O chiplet 101. In some embodiments, 4 of the 24 optical fibers carry continuous wave laser light for a first laser wavelength group to optical macros 205 in the TeraPHYe MIPO I/O chiplet 101. Also, another 4 of the 24 optical fibers carry continuous wave laser light for a second laser wavelength group to optical macros 205 in the TeraPHYe MIPO I/O chiplet 101. Also, another 8 of the 24 optical fibers carry modulated light away from the transmit (Tx) slices within the optical macros 205 in the TeraPHYe MIPO I/O chiplet 101. Also, another 8 of the 24 optical fibers carry modulated light to the receive (Rx) slices within the optical macros 205 in the TeraPHYe MIPO I/O chiplet 101. In some embodiments, the Gearbox 705 of each TeraPHYe pod 701 within the eight TeraPHYe modules 801-1 to 801-8 connects the TeraPHYe MIPO I/O chiplet 101 of the corresponding TeraPHYe pod 701 to one of the Ethernet switch chips/die 1103-1, 1103-2 through an XSR serial interface link 1105. In some embodiments, each optical macro 205 within the TeraPHYe MIPO I/O chiplets 101 serializes data onto a single optical port (a 200 Gbps/400 Gbps for the 50 Tbps solution). In some embodiments, wavelength splitting and combining onto optical ports occurs within the TeraPHYe MIPO I/O chiplet 101. In some embodiments, a fiber shuffle network external to the Ethernet switch SiP 1100 provides optical fiber management at the board level so as to separate data signals (SMF) and laser fibers (PMF) to the board-level laser modules and/or faceplate connectors.

It should be understood that in different embodiments, an Ethernet switch SiP can be implemented in a manner similar to the Ethernet switch SiP 1100, but with a different number (x) of TeraPHYe module(s) 801-(1 to x), where x is greater than or equal to 1, and/or a different number (y) of Ethernet switch chip(s)/die 1103-(1 to y), where y is greater than or equal to 1, and/or with a different number (z) of TeraPHYe pod(s) 701-(1 to z) per TeraPHYe module 801-(1 to x), where z is greater than or equal to 1. For example, in some embodiments, an Ethernet switch SiP is implemented in a manner similar to the Ethernet switch SiP 1100, but with one Ethernet switch chip(s)/die 1103-1 and with eight TeraPHYe module(s) 801-1 to 801-8 and with two TeraPHYe pods 701-1 to 701-2 per TeraPHYe module 801-1 to 801-8. In another example embodiment, an Ethernet switch SiP is implemented in a manner similar to the Ethernet switch SiP 1100, but with one Ethernet switch chip(s)/die 1103-1 and with four TeraPHYe module(s) 801-1 to 801-4 and with two TeraPHYe pods 701-1 to 701-2 per TeraPHYe module 801-1 to 801-4. In another example embodiment, an Ethernet switch SiP is implemented in a manner similar to the Ethernet switch SiP 1100, but with four Ethernet switch chip(s)/die 1103-1 and with eight TeraPHYe module(s) 801-1 to 801-8 and with two TeraPHYe pods 701-1 to 701-2 per TeraPHYe module 801-1 to 801-8.

In an example embodiment, a network switch system-in-package (e.g., 1100) is disclosed. The network switch system-in-package includes a carrier substrate (e.g., 1101), a network switch chip (e.g., 1103-1, 1103-2) disposed on the carrier substrate, and a plurality of photonic input/output modules (e.g., 801-1 to 801-8) disposed on the carrier substrate. In some embodiments, the carrier substrate is either an embedded interconnect bridge substrate, an optically-enabled wafer-level fanout substrate, a thin-film substrate, or an organic substrate. Each of the plurality of photonic input/output modules includes a module substrate (e.g., 801) and a plurality of photonic chip pods (e.g., 701) disposed on the module substrate. Each photonic chip pod of the plurality of photonic chip pods includes a pod substrate (e.g., 703), a photonic input/output chiplet (e.g., 101) attached to the pod substrate, and a gearbox chiplet (e.g., 705) attached to the pod substrate. The photonic input/output chiplet includes a parallel electrical interface (e.g., 201), a photonic interface (e.g., 203), and a plurality of optical macros (e.g., 205-1 to 205-N) implemented between the photonic interface and the parallel electrical interface. The gearbox chiplet is attached the pod substrate in electrical connection with both the parallel electrical interface of the photonic input/output chiplet and a serial electrical interface of the network switch chip. The gearbox chiplet is configured to provide conversion between the parallel electrical interface of the photonic input/output chiplet and the serial electrical interface of the switch chip.

In some example embodiments, each of the plurality of photonic input/output modules is positioned at a periphery of the carrier substrate such that the photonic interface of each photonic input/output chiplet in each of the plurality of photonic chip pods of the plurality of photonic input/output modules is positioned along the periphery of the carrier substrate. In some embodiments, each photonic interface of each photonic input/output chiplet in each of the plurality of photonic chip pods of the plurality of photonic input/output modules includes a plurality of optical alignment structures (e.g., v-grooves) configured to respectively receive and position a plurality of optical fibers of a corresponding fiber attach unit (e.g., 501). In some example embodiments, fiber attach units are respectively connected to the photonic interfaces of the photonic input/output chiplets of the plurality of photonic chip pods of the plurality of photonic input/output modules.

In an example embodiment, a number of the plurality of photonic input/output modules is eight, and a number of the plurality of photonic chip pods per photonic input/output module is two, and the network switch system-in-package includes a first network switch chip and a second network switch chip. In some implementations of this example embodiment, the carrier substrate has a rectangular shape defined by four peripheral edges, where two of the eight photonic input/output modules are positioned at each one of the four peripheral edges of the carrier substrate, such that the photonic interface of each photonic input/output chiplet is positioned along a periphery of the carrier substrate. Also, in some implementations of this example embodiment, the first network switch chip and the second network switch chip are positioned at a central region of the carrier substrate. In some implementations of this example embodiment, a first set of four of the eight photonic input/output modules are electrically connected for bi-directional data communication with the first network switch chip, and a second set of four of the eight photonic input/output modules are electrically connected for bi-directional data communication with the second network switch chip.

In some implementations of this example embodiment, data communication between each photonic input/output module of the first set of four photonic input/output modules and the first network switch chip is through a respective extra short reach (XSR) serial interface, and data communication between each photonic input/output module of the second set of four photonic input/output modules and the second network switch chip is through a respective XSR serial interface. In some implementations of this example embodiment, sixteen fiber attach units are connected to the network switch system-in-package, with each fiber attach unit connected to the photonic interface of a different one of the photonic input/output chiplets of the photonic chip pods of the eight photonic input/output modules. In some embodiments, each of the sixteen fiber attach units includes twenty-four optical fibers. In some embodiments, a first set of eight of the twenty-four optical fibers carry incoming continuous wave light, a second set of eight of the twenty-four optical fibers carry outgoing modulated light, and a third set of eight of the twenty-four optical fibers carry incoming modulated light. Also, in some implementations of this example embodiment, the first network switch chip is a first Ethernet switch configured to operate at 50 terabits per second, and the second network switch chip is a second Ethernet switch configured to operate at 50 terabits per second.

Figure 12:
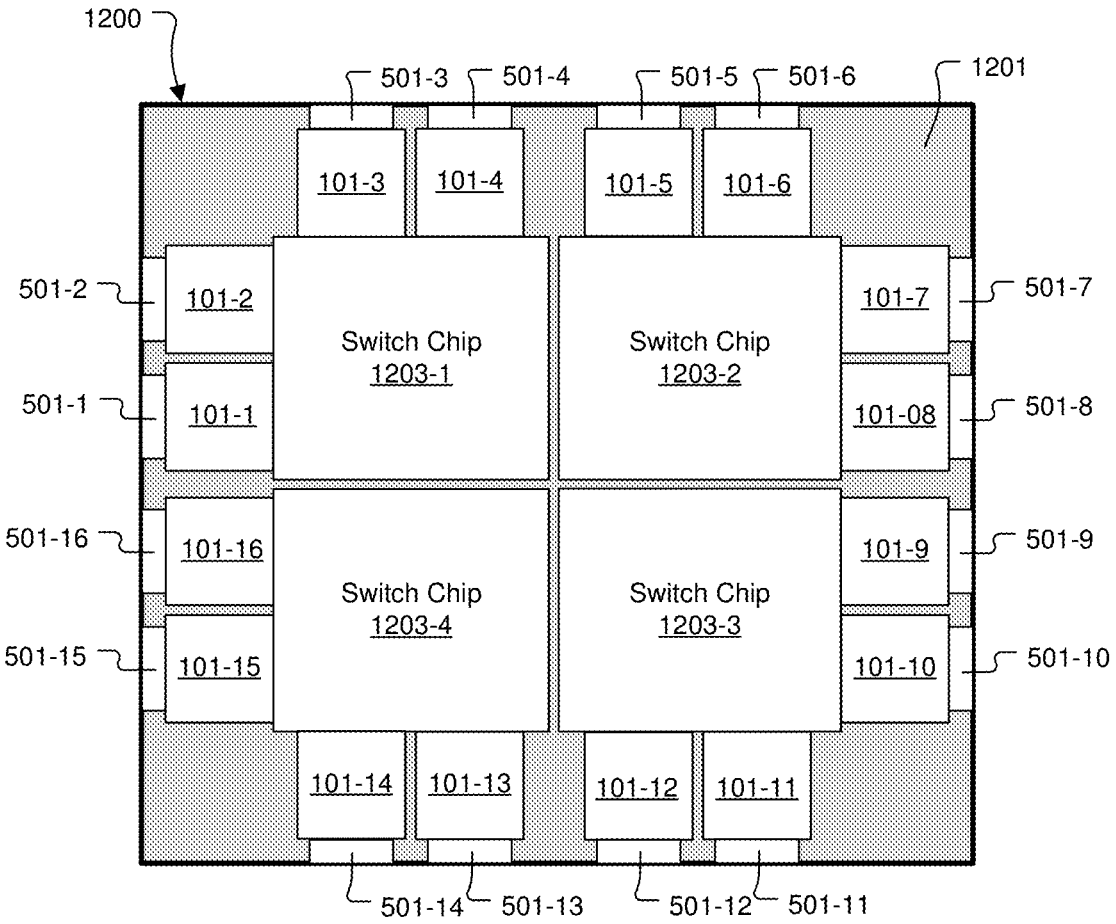
FIG. 12 shows a floorplan diagram of an Ethernet switch system-in-package solution that implements multiple instances of the TeraPHYe MIPO I/O chiplet of FIG. 1 in close connection with multiple Ethernet switch chips/die, in accordance with some embodiments.

FIG. 12 shows a floorplan diagram of an Ethernet switch SiP 1200 solution that implements multiple instances of the TeraPHYe MIPO I/O chiplet 101 in close connection with multiple Ethernet switch chips/die 1203-1 to 1203-4, in accordance with some embodiments. The example Ethernet switch SiP 1200 includes sixteen TeraPHYe MIPO I/O chiplets 101-1 to 101-16 disposed on a carrier substrate 1121, and four Ethernet switch chips/die 1203-1 to 1203-4 disposed on the carrier substrate 1201. The sixteen TeraPHYe MIPO I/O chiplets 101-1 to 101-16 are positioned around the periphery of the carrier substrate 1201 with their respective FAU 501-1 to 501-16 facing toward a corresponding peripheral edge of the carrier substrate 1201. More specifically, in the example Ethernet switch SiP 1200, four instances of the TeraPHYe MIPO I/O chiplet 101 are positioned at each peripheral edge of the carrier substrate 1201. The four Ethernet switch chips/die 1203-1 to 1203-4 are positioned at the core (central location) of the carrier substrate 1201. In the example Ethernet switch SiP 1200, a respective group of four of the TeraPHYe MIPO I/O chiplets 101-1 to 101-16 are connected to a given one of the Ethernet switch chips/die 1203-1 to 1203-4. Specifically, the TeraPHYe MIPO I/O chiplets 101-1 to 101-4 are connected to the Ethernet switch chip/die 1203-1. The TeraPHYe MIPO I/O chiplets 101-5 to 101-8 are connected to the Ethernet switch chip/die 1203-2. The TeraPHYe MIPO I/O chiplets 101-9 to 101-12 are connected to the Ethernet switch chip/die 1203-3. The TeraPHYe MIPO I/O chiplets 101-13 to 101-16 are connected to the Ethernet switch chip/die 1203-4. In some embodiments, the Ethernet switch SiP 1200 is a 2.5D assembly. In some embodiments, the carrier substrate 1201 is an embedded interconnect bridge (EMIB) substrate. In some embodiments, the carrier substrate 1201 is an optically-enabled wafer-level fanout (O-WLFO) substrate. In some embodiments, the carrier substrate 1201 is a thin-film on organic substrate. Also, in some embodiments, the TeraPHYe MIPO I/O chiplets 101-1 to 101-16 are FR8 chiplets.

In some embodiments, the Ethernet switch SiP 1200 is a 100 Tbps Ethernet switch with 800 Gbps per port. In some embodiments, each of the FAUs 501-1 to 501-16 connects 24 optical fibers to a corresponding one of TeraPHYe MIPO I/O chiplets 101-1 to 101-16. In some embodiments, 8 of the 24 optical fibers carry continuous wave laser light to optical macros 205 in the TeraPHYe MIPO I/O chiplet 101. Also, another 8 of the 24 optical fibers carry modulated light away from the transmit (Tx) slices within the optical macros 205 in the TeraPHYe MIPO I/O chiplet 101. Also, another 8 of the 24 optical fibers carry modulated light to the receive (Rx) slices within the optical macros 205 in the TeraPHYe MIPO I/O chiplet 101.

In some embodiments of the 100 Tbps Ethernet switch SiP 1200, the sixteen TeraPHYe MIPO I/O chiplets 101-1 to 101-16 are co-packaged closely with four switch chips/die 1203-1 to 1203-4 using a wide-parallel interface, such as AIB or HBI. In this manner, the TeraPHYe MIPO I/O chiplets 101-1 to 101-16 in the 100 Tbps Ethernet switch SiP 1200 of FIG. 12 are more tightly integrated with the switch chips 1203-1 to 1203-4, as compared to the connections between the TeraPHY MIPO I/O chiplets 101 and the switch chips/die 1103-1, 1103-2 in the 50 Tbps Ethernet switch SiP 1100 of FIG. 11. Also, in the 100 Tbps Ethernet switch SiP 1200 of FIG. 12, connection of the TeraPHYe MIPO I/O chiplets 101-1 to 101-16 to the switch chips/die 1203-1 to 1203-4 through the energy-efficient wide-parallel interfaces eliminate both the XSR serial interface links and the Gearbox chips that are used in the TeraPHYe pods 701 in the 50 Tbps Ethernet switch SiP 1100 of FIG. 11.

In some embodiments, each optical macro 205 within the TeraPHYe MIPO I/O chiplets 101-1 to 101-16 serializes data onto a single optical port (800 Gbps for the 100 Tbps solution). In some embodiments, wavelength splitting and combining onto optical ports occurs within the TeraPHYe MIPO I/O chiplets 101-1 to 101-16. In some embodiments, a fiber shuffle network external to the Ethernet switch SiP 1200 provides optical fiber management at the board level so as to separate data signals (SMF) and laser fibers (PMF) to the board-level laser modules and/or faceplate connectors.

The 100 Tbps Ethernet switch SiP 1200 of FIG. 12 achieves high bandwidth density and energy-efficiency. Also, because the photonic link control and drive functionality and operations are implemented within the TeraPHYe MIPO I/O chiplets 101-1 to 101-16, more chip area is available with the switch chips/die 1203-1 to 1203-4 for implementation of switching functionality and operations. This enables the Ethernet switch SiP 1200 to provide a 100 Tbps solution in roughly the same power footprint as the XSR-based 50 Tbps Ethernet switch SiP 1100 of FIG. 11, while also reducing the I/O package footprint and leaving more space for increased switch chip/die 1203-1 to 1203-4 resources to support the 100 Tbps switching function.

FIG. 13 shows a table that includes an energy breakdown for the 50 Tbps Ethernet switch SiP 1100 solution of FIG. 11 and for two variants of the 100 Tbps Ethernet switch SiP 1200 of FIG. 12, in accordance with some embodiments. In the first variant of the 100 Tbps Ethernet switch SiP 1200 in FIG. 13, the TeraPHYe MIPO I/O chiplets 101-1 to 101-16 implement CWDM using eight wavelengths per port with a data rate per wavelength of 106 Gbps NRZ (not return to zero). In FIG. 13, the first variant of the 100 Tbps Ethernet switch SiP 1200 is identified as the "100 Tbps System CWDM" variant. In the second variant of the 100 Tbps Ethernet switch SiP 1200 in FIG. 13, the TeraPHYe MIPO I/O chiplets 101-1 to 101-16 implement dense WDM using sixteen wavelengths per port with a lower data rate per wavelength of 53 Gbps NRZ (not return to zero). In FIG. 13, the second variant of the 100 Tbps Ethernet switch SiP 1200 is identified as the "100 Tbps System WDM" variant. The 100 Tbps System WDM variant achieves better energy cost per bit as compared to the 100 Tbps System CWDM variant, while maintaining the same bandwidth density as the 100 Tbps System CWDM variant. The dense WDM grid variant (100 Tbps System WDM variant) is not compatible with existing CWDM standards, but instead relies on the available laser grid from the Continuous-Wave Wavelength Division Multiplexing Multi-Source Agreement (CW-WDM MSA). For compute fabric applications, where aggregate socket throughputs are in the few Tbsp to 50 Tbps range, the 100 Tbps Ethernet switch SiP 1200 of FIG. 12 is configured in a 16 Gpbs to 32 Gpbs NRZ per wavelength format, which provides even lower energy per bit, approaching 1 picoJoule per bit (pJ/b) per TeraPHYe optical macro 205.

Figure 14:
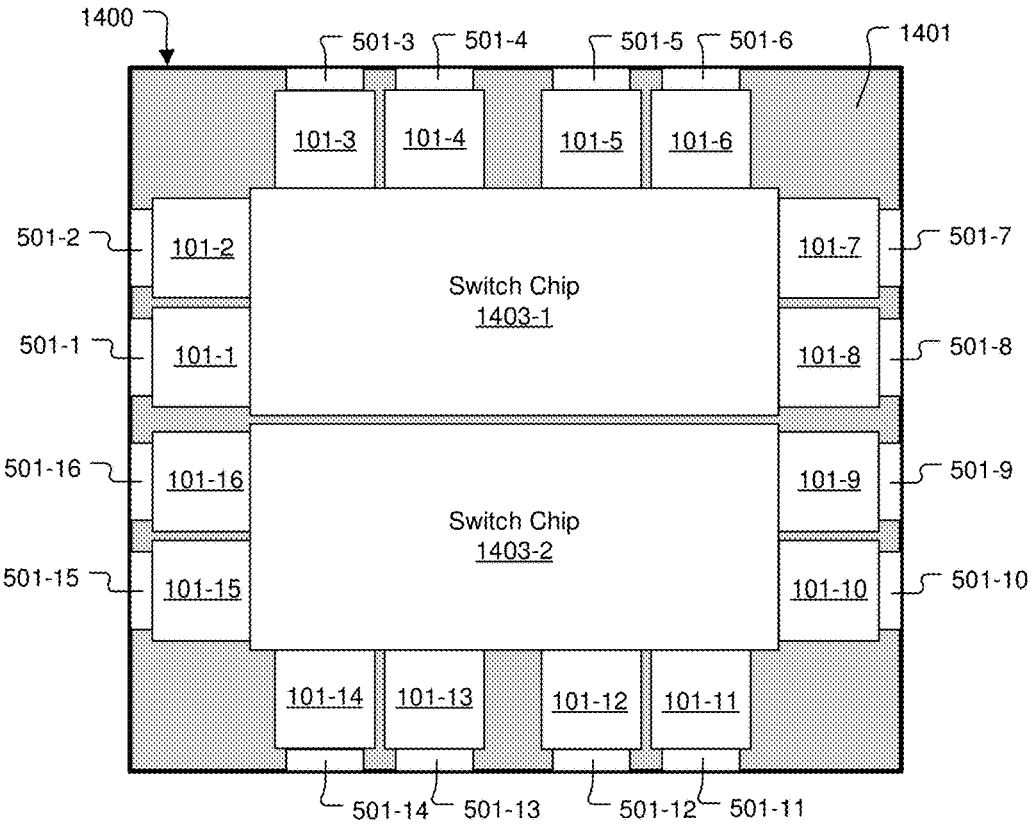
FIG. 14 shows a floorplan of an Ethernet switch SiP that includes two Ethernet switch chips/die in close connection with sixteen TeraPHYe MIPO I/O chiplets, in accordance with some embodiments.

It should be understood that in various embodiments an Ethernet switch SiP can be implemented to include one or more Ethernet switch chips/die in close connection with one or more TeraPHYe MIPO I/O chiplets. For example, FIG. 14 shows a floorplan of an Ethernet switch SiP 1400 that includes two Ethernet switch chips/die 1403-1 and 1403-2 in close connection with sixteen TeraPHYe MIPO I/O chiplets 101-1 to 101-16, in accordance with some embodiments. The Ethernet switch SiP 1400 is a variation of the Ethernet switch SiP 1200. Therefore, the concepts and principles described above with regard to the Ethernet switch SiP 1200 are equally applicable to the Ethernet switch SiP 1400. In the Ethernet switch SiP 1400, the two Ethernet switch chips/die 1403-1 and 1403-2 and the sixteen TeraPHYe MIPO I/O chiplets 101-1 to 101-16 are attached to a carrier substrate 1401. The first Ethernet switch chip/die 1403-1 is electrically connected in bi-direction data communication with eight of the TeraPHYe MIPO I/O chiplets 101-1 to 101-8. It should be understood that in some embodiments the parallel electrical interface 201 of each of the eight TeraPHYe MIPO I/O chiplets 101-1 to 101-8 is directly electrically connected to the first Ethernet switch chip/die 1403-1 through electrical connections formed within the carrier substrate 1401. The second Ethernet switch chip/die 1403-2 is electrically connected in bi-direction data communication with another eight of the TeraPHYe MIPO I/O chiplets 101-9 to 101-16. It should be understood that in some embodiments the parallel electrical interface 201 of each of the eight TeraPHYe MIPO I/O chiplets 101-9 to 101-16 is directly electrically connected to the second Ethernet switch chip/die 1403-2 through electrical connections formed within the carrier substrate 1401.

Figure 15:
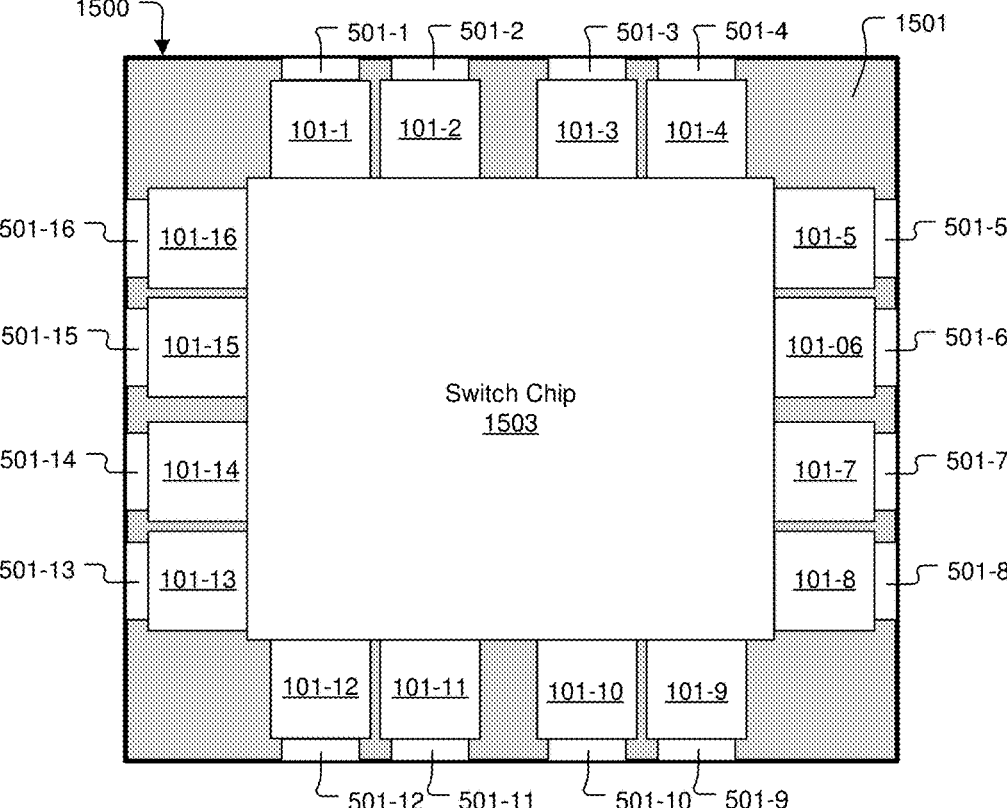
FIG. 15 shows a floorplan of an Ethernet switch SiP that includes one Ethernet switch chips/die in close connection with sixteen TeraPHYe MIPO I/O chiplets, in accordance with some embodiments.

In another example, FIG. 15 shows a floorplan of an Ethernet switch SiP 1500 that includes one Ethernet switch chip/die 1503 in close connection with sixteen TeraPHYe MIPO I/O chiplets 101-1 to 101-16, in accordance with some embodiments. The Ethernet switch SiP 1500 is a variation of the Ethernet switch SiP 1200. Therefore, the concepts and principles described above with regard to the Ethernet switch SiP 1200 are equally applicable to the Ethernet switch SiP 1500. In the Ethernet switch SiP 1500, the Ethernet switch chip/die 1503 and the sixteen TeraPHYe MIPO I/O chiplets 101-1 to 101-16 are attached to a carrier substrate 1501. The Ethernet switch chip/die 1503 is electrically connected in bi-direction data communication with all sixteen of the TeraPHYe MIPO I/O chiplets 101-1 to 101-16. It should be understood that in some embodiments the parallel electrical interface 201 of each of the sixteen TeraPHYe MIPO I/O chiplets 101-1 to 101-16 is directly electrically connected to the Ethernet switch chip/die 1503 through electrical connections formed within the carrier substrate 1501. It should be understood that in various embodiments the concepts and principles disclosed herein can be implemented to form an Ethernet switch SiP that includes one or more Ethernet switch chip(s)/die and one or more TeraPHYe MIPO I/O chiplet(s), where each of the one or more TeraPHYe MIPO I/O chiplet(s) is electrically close-connected in bi-directional data communication with any one of the one or more Ethernet switch chip(s)/die.

In an example embodiment, a network switch system-in-package (e.g., 1200) is disclosed. The network switch system-in-package includes a carrier substrate (e.g., 1201), a network switch chip (e.g., 1203-1 to 1203-4) disposed on the carrier substrate, and a plurality of photonic input/output chiplets (e.g., 101-1 to 101-16) attached to the carrier substrate. In some embodiments, the carrier substrate is either an embedded interconnect bridge substrate, an optically-enabled wafer-level fanout substrate, a thin-film substrate, or an organic substrate. Each of the plurality of photonic input/output chiplets includes an electrical interface (e.g., 201) electrically connected for bi-directional data communication with the network switch chip. Each of the plurality of photonic input/output chiplets also includes a photonic interface (e.g., 203) and a plurality of optical macros (e.g., 205-1 to 205-N) implemented between the photonic interface and the electrical interface. In some implementations of this example embodiment, data communication between each of the plurality of photonic input/output chiplets and the network switch chip is through a parallel electrical interface. Also, in some embodiments, this parallel electrical interface is either an advanced interface bus (AIB) interface or a high-bandwidth interconnect (HBI) interface.

In some implementations of this example embodiment, each of the plurality of photonic input/output chiplets is positioned along a periphery of the carrier substrate. In some embodiments, each photonic interface of the plurality of photonic input/output chiplets includes a plurality of optical alignment structures positioned along the periphery of the carrier substrate to respectively receive and position a plurality of optical fibers of a corresponding fiber attach unit (e.g., 501). In some implementations of this example embodiment, a plurality of fiber attach units are respectively connected to the photonic interfaces of the plurality of photonic input/output chiplets.

In an example embodiment, a number of the plurality of photonic input/output chiplets is eight, and a number of the plurality of photonic input/output chiplets is sixteen, and the network switch system-in-package includes a first network switch chip and a second network switch chip. In some embodiments, the carrier substrate has a rectangular shape defined by four peripheral edges, where four of the sixteen photonic input/output chiplets are positioned at each one of the four peripheral edges of the carrier substrate, such that the photonic interface of each of the plurality of photonic input/output chiplets is positioned along a periphery of the carrier substrate. In some embodiments, the first network switch chip and second network switch chip are positioned at a central region of the carrier substrate. In some embodiments, a first set of eight of the sixteen photonic input/output chiplets are electrically connected for bi-directional data communication with the first network switch chip, and a second set of eight of the sixteen photonic input/output chiplets are electrically connected for bi-directional data communication with the second network switch chip. Also, in some embodiments, sixteen fiber attach units are connected to the network switch system-in-package, with each fiber attach unit connected to the photonic interface of a different one of the sixteen photonic input/output chiplets. In some embodiments, each of the sixteen fiber attach units includes twenty-four optical fibers. In some embodiments, a first set of eight of the twenty-four optical fibers carry incoming continuous wave light, a second set of eight of the twenty-four optical fibers carry outgoing modulated light, and a third set of eight of the twenty-four optical fibers carry incoming modulated light. In some embodiments, the first network switch chip is a first Ethernet switch configured to operate at 100 terabits per second, and the second network switch chip is a second Ethernet switch configured to operate at 100 terabits per second.

In another example embodiment, a number of the plurality of photonic input/output chiplets is sixteen, and the network switch system-in-package includes four network switch chips referred to as a first network switch chip, a second network switch chip, a third network switch chip, and a fourth network switch chip. In some embodiments, the carrier substrate has a rectangular shape defined by four peripheral edges, where four of the sixteen photonic input/output chiplets are positioned at each one of the four peripheral edges of the carrier substrate, such that the photonic interface of each of the plurality of photonic input/output chiplets is positioned along a periphery of the carrier substrate. In some embodiments, the first network switch chip, the second network switch chip, the third network switch chip, and the fourth network switch chip are positioned at a central region of the carrier substrate. In some embodiments, a first set of four of the sixteen photonic input/output chiplets are electrically connected for bi-directional data communication with the first network switch chip, a second set of four of the sixteen photonic input/output chiplets are electrically connected for bi-directional data communication with the second network switch chip, a third set of four of the sixteen photonic input/output chiplets are electrically connected for bi-directional data communication with the third network switch chip, and a fourth set of four of the sixteen photonic input/output chiplets are electrically connected for bi-directional data communication with the fourth network switch chip. In some embodiments, sixteen fiber attach units are connected to the network switch system-in-package, with each fiber attach unit connected to the photonic interface of a different one of the sixteen photonic input/output chiplets. In some embodiments, each of said sixteen fiber attach units includes twenty-four optical fibers. In some embodiments, a first set of eight of the twenty-four optical fibers carry incoming continuous wave light, a second set of eight of the twenty-four optical fibers carry outgoing modulated light, and a third set of eight of the twenty-four optical fibers carry incoming modulated light. In some embodiments, the first network switch chip is a first Ethernet switch configured to operate at 100 terabits per second, the second network switch chip is a second Ethernet switch configured to operate at 100 terabits per second, the third network switch chip is a third Ethernet switch configured to operate at 100 terabits per second, and the fourth network switch chip is a fourth Ethernet switch configured to operate at 100 terabits per second.

FIG. 16 shows a flowchart of a method for manufacturing a photonic chip pod, in accordance with some embodiments. The method includes an operation 1601 for connecting a photonic input/output chiplet (e.g., 101) to a substrate (e.g., 703), where the photonic input/output chiplet includes a parallel electrical interface (e.g., 201), a photonic interface (e.g., 203), and a plurality of optical macros (e.g., 205-1 to 205-N) implemented between the photonic interface and the parallel electrical interface. The method also includes an operation 1603 connecting a gearbox chiplet (e.g., 705) to the substrate such that the gearbox chiplet is in electrical connection with the parallel electrical interface of the photonic input/output chiplet. The gearbox chiplet is configured to provide conversion between the parallel electrical interface of the photonic input/output chiplet and a serial electrical interface of another chip. In some embodiments, the serial electrical interface of the other chip is either an extra short reach (XSR) serial interface or an ultra short reach (USR) serial interface. In some embodiments, the parallel electrical interface of the photonic input/output chiplet is either an advanced interface bus (AIB) interface or a high-bandwidth interconnect (HBI) interface.

FIG. 17 shows a flowchart of a method for manufacturing a photonic input/output module, in accordance with some embodiments. The method includes an operation 1701 for connecting a plurality of photonic chip pods (e.g., 701) to a module substrate (e.g., 803). Each photonic chip pod of the plurality of photonic chip pods includes a pod substrate (e.g., 703) and a photonic input/output chiplet (e.g., 101) attached to the pod substrate, and a gearbox chiplet (e.g., 705) attached to the pod substrate. The photonic input/output chiplet includes a parallel electrical interface (e.g., 201), a photonic interface (e.g., 203), and a plurality of optical macros (e.g., 205-1 to 205-N) implemented between the photonic interface and the parallel electrical interface. The gearbox chiplet is attached the pod substrate in electrical connection with the parallel electrical interface of the photonic input/output chiplet. The gearbox chiplet is configured to provide conversion between the parallel electrical interface of the photonic input/output chiplet and a serial electrical interface another chip. The method also includes an operation 1703 for connecting a plurality of fiber attach units (e.g., 501) to respective photonic interfaces of the photonic input/output chiplets of the plurality of photonic chip pods.

In some embodiments, the photonic interface of the photonic input/output chiplet includes a plurality of optical alignment structures (e.g., v-grooves) configured to respectively receive and position a plurality of optical fibers of a corresponding one of the plurality of fiber attach units for respective optical coupling of the plurality of optical fibers with a plurality of optical grating couplers (e.g., 301) formed within the photonic input/output chiplet. In some embodiments, the operation 1703 includes disposing the plurality of optical fibers of a given one of the plurality of fiber attach units within the plurality of optical alignment structures of the photonic input/output chiplet of a given one of the plurality of photonic chip pods.

In some embodiments, the method of FIG. 17 also includes an operation for forming a plurality of cutout regions (e.g., 1001) within an outer periphery of the module substrate. In these embodiments, the method also includes an operation for positioning the plurality of photonic chip pods on the module substrate so that the plurality of optical alignment structures of the photonic input/output chiplet of each one of the plurality of photonic chip pods is positioned over a corresponding one of the plurality of cutout regions, such as shown in FIG. 10. In some embodiments, the method includes an operation for disposing a plurality of cover structures (e.g., 901) respectively within the plurality of cutout regions, where a given one of the plurality of cover structures is configured to cover a portion of the plurality of optical fibers of a given one of the plurality of fiber attach units that is disposed within the plurality of optical alignment structures of the photonic input/output chiplet of a given one of the plurality of photonic chip pods that is positioned over the corresponding one of the plurality of cutout regions. In some embodiments, the method includes an operation for disposing a glob top material within each of plurality of cutout regions over the plurality of cover structures.

In some embodiments, the method of FIG. 17 also includes an operation for attaching an integrated heat spreader (e.g., 909) to the module substrate so that the integrated heat spreader extends over the plurality of photonic chip pods with an exposed surface of the photonic input/output chiplet of each of the plurality of photonic chip pods facing toward the integrated heat spreader. In some embodiments, the method also includes disposing a thermal interface material (e.g., 905) between the integrated heat spreader and the photonic input/output chiplet of each of the plurality of photonic chip pods.

FIG. 18 shows a flowchart of a method for manufacturing a network switch system-in-package (e.g., 1100), in accordance with some embodiments. The method includes an operation 1801 for attaching a network switch chip (e.g., 1103-1, 1103-2) to a carrier substrate (e.g., 1101). In some embodiments, the carrier substrate is either an embedded interconnect bridge substrate, an optically-enabled wafer-level fanout substrate, a thin-film substrate, or an organic substrate. The method also includes an operation 1803 for attaching a plurality of photonic input/output modules (e.g., 801-1 to 801-8) to the carrier substrate. Each of the plurality of photonic input/output modules includes a module substrate (e.g., 803) and a plurality of photonic chip pods (e.g., 701) disposed on the module substrate. Each photonic chip pod of the plurality of photonic chip pods includes a pod substrate (e.g., 703), a photonic input/output chiplet (e.g., 101) attached to the pod substrate, and a gearbox chiplet (e.g., 705) attached to the pod substrate. The photonic input/output chiplet includes a parallel electrical interface (e.g., 201), a photonic interface (e.g., 203), and a plurality of optical macros (e.g., 205-1 to 205-N) implemented between the photonic interface and the parallel electrical interface. The gearbox chiplet is attached the pod substrate in electrical connection with both the parallel electrical interface of the photonic input/output chiplet and a serial electrical interface of the network switch chip. The gearbox chiplet is configured to provide conversion between the parallel electrical interface of the photonic input/output chiplet and the serial electrical interface of the network switch chip.

In some embodiments, the method of FIG. 18 includes an operation for positioning each of the plurality of photonic input/output modules at a periphery of the carrier substrate, such that the photonic interface of each photonic input/output chiplet in each of the plurality of photonic chip pods of the plurality of photonic input/output modules is positioned along the periphery of the carrier substrate. In some embodiments, each photonic interface of each photonic input/output chiplet in each of the plurality of photonic chip pods of the plurality of photonic input/output modules includes a plurality of optical alignment structures configured to respectively receive and position a plurality of optical fibers of a corresponding fiber attach unit (e.g., 501). In some embodiments, the method includes an operation for connecting a separate fiber attach unit to each of the photonic interfaces of the photonic input/output chiplets of the plurality of photonic chip pods of the plurality of photonic input/output modules.

In an example embodiment of the method of FIG. 18, a number of the plurality of photonic input/output modules is eight, and a number of the plurality of photonic chip pods per photonic input/output module is two, and the method includes attaching both a first network switch chip and a second network switch chip to the carrier substrate. In some embodiments, the carrier substrate has a rectangular shape defined by four peripheral edges, where two of the eight photonic input/output modules are positioned at each one of the four peripheral edges of the carrier substrate, such that the photonic interface of each photonic input/output chiplet in each of the two photonic chip pods of the eight photonic input/output modules is positioned along a periphery of the carrier substrate. In some embodiments, both the first network switch chip and the second network switch chip are positioned at a central region of the carrier substrate. In some embodiments, the method includes electrically connecting a first set of four of the eight photonic input/output modules for bi-directional data communication with the first network switch chip, and electrically connecting a second set of four of the eight photonic input/output modules for bi-directional data communication with the second network switch chip. In some embodiments, the method includes an operation for implementing a respective extra short reach (XSR) serial interface for data communication between each photonic input/output module of the first set of four of the eight photonic input/output modules and the first network switch chip. Also, in some embodiments, the method includes an operation for implementing a respective XSR serial interface for data communication between each photonic input/output module of the second set of four of the eight photonic input/output modules and the second network switch chip. Also, in some embodiments, the method includes an operation for connecting a separate one of sixteen fiber attach units (e.g., 501) to the photonic interface of each different one of the photonic input/output chiplets of the photonic chip pods of the eight photonic input/output modules. In some embodiments, each of the sixteen fiber attach units includes twenty-four optical fibers. In some embodiments, a first set of eight of the twenty-four optical fibers carry incoming continuous wave light, a second set of eight of the twenty-four optical fibers carry outgoing modulated light, and a third set of eight of the twenty-four optical fibers carry incoming modulated light. In some embodiments, the first network switch chip is a first Ethernet switch configured to operate at 50 terabits per second, and the second network switch chip is a second Ethernet switch configured to operate at 50 terabits per second.

FIG. 19 shows a flowchart of a method for manufacturing a network switch system-in-package (e.g., 1200, 1400, 1500), in accordance with some embodiments. The method includes an operation 1901 for attaching a network switch chip (e.g., 1203-1 to 1203-4; 1403-1, 1403-2; 1503) to a carrier substrate (e.g., 1201, 1401, 1501). In some embodiments, the carrier substrate is either an embedded interconnect bridge substrate, an optically-enabled wafer-level fanout substrate, a thin-film substrate, or an organic substrate. The method also includes an operation 1903 for attaching a plurality of photonic input/output chiplets (e.g., 101-1 to 101-16) to the carrier substrate, such that a respective electrical interface (e.g., 201) of each of the plurality of photonic input/output chiplets is electrically connected for bi-directional data communication with the network switch chip. In some embodiments, the method includes implementing data communication between each of the plurality of photonic input/output chiplets and the network switch chip through a parallel electrical interface. In some embodiments, the parallel electrical interface is either an advanced interface bus (AIB) interface or a high-bandwidth interconnect (HBI) interface. Each of the plurality of photonic input/output chiplets has a photonic interface (e.g., 203) and a plurality of optical macros (e.g., 205-1 to 205-N) implemented between the photonic interface and the respective electrical interface.

In some embodiments, the method of FIG. 19 includes positioning each of the plurality of photonic input/output chiplets along a periphery of the carrier substrate. In some embodiments, the method includes positioning a plurality of optical alignment structures (e.g., v-grooves) of each photonic interface of the plurality of photonic input/output chiplets along the periphery of the carrier substrate to respectively receive and position a plurality of optical fibers of a corresponding fiber attach unit (e.g., 501). In some embodiments, the method includes connecting a plurality of fiber attach units to respective ones of said photonic interfaces of the plurality of photonic input/output chiplets.

In some embodiments of the method of FIG. 19, a number of the plurality of photonic input/output chiplets is eight. In some embodiments of the method of FIG. 19, a number of the plurality of photonic input/output chiplets is sixteen, and the method includes attaching both a first network switch chip and a second network switch to the carrier substrate. In some embodiments, the carrier substrate has a rectangular shape defined by four peripheral edges, wherein four of the sixteen photonic input/output chiplets are positioned at each one of the four peripheral edges of the carrier substrate, such that the photonic interface of each of the plurality of photonic input/output chiplets is positioned along a periphery of the carrier substrate. In some embodiments, both the first network switch chip and the second network switch chip are positioned at a central region of the carrier substrate. In some embodiments, the method includes electrically connecting a first set of eight of the sixteen photonic input/output chiplets for bi-directional data communication with the first network switch chip, and electrically connecting a second set of eight of the sixteen photonic input/output chiplets for bi-directional data communication with the second network switch chip. In some embodiments, the method includes connecting a separate one of sixteen fiber attach units (e.g., 501) to the photonic interface of each different one of the sixteen photonic input/output chiplets. In some embodiments, each of the sixteen fiber attach units includes twenty-four optical fibers. In some embodiments, a first set of eight of the twenty-four optical fibers carry incoming continuous wave light, a second set of eight of the twenty-four optical fibers carry outgoing modulated light, and a third set of eight of the twenty-four optical fibers carry incoming modulated light. In some embodiments, the first network switch chip is a first Ethernet switch configured to operate at 100 terabits per second, and the second network switch chip is a second Ethernet switch configured to operate at 100 terabits per second.

In another example embodiment of the method of FIG. 19, a number of the plurality of photonic input/output chiplets is sixteen. In this example embodiment, the method includes attaching a first network switch chip to the carrier substrate, attaching a second network switch chip to the carrier substrate, attaching a third network switch chip to the carrier substrate, and attaching a fourth network switch chip to the carrier substrate. In some embodiments, the carrier substrate has a rectangular shape defined by four peripheral edges, where four of the sixteen photonic input/output chiplets are positioned at each one of the four peripheral edges of the carrier substrate, such that the photonic interface of each of the plurality of photonic input/output chiplets is positioned along a periphery of the carrier substrate. In some embodiments, the first network switch chip, the second network switch chip, the third network switch chip, and the fourth network switch chip are positioned at a central region of the carrier substrate.

In some embodiments, the method includes electrically connecting a first set of four of the sixteen photonic input/output chiplets for bi-directional data communication with the first network switch chip, and electrically connecting a second set of four of the sixteen photonic input/output chiplets for bi-directional data communication with the second network switch chip, and electrically connecting a third set of four of the sixteen photonic input/output chiplets for bi-directional data communication with the third network switch chip, and electrically connecting a fourth set of four of the sixteen photonic input/output chiplets for bi-directional data communication with the fourth network switch chip. In some embodiments, the method includes connecting a separate one of sixteen fiber attach units (e.g., 501) to the photonic interface of each different one of the sixteen photonic input/output chiplets. In some embodiments, each of the sixteen fiber attach units includes twenty-four optical fibers. In some embodiments, a first set of eight of the twenty-four optical fibers carry incoming continuous wave light, a second set of eight of the twenty-four optical fibers carry outgoing modulated light, and a third set of eight of the twenty-four optical fibers carry incoming modulated light. In some embodiments, the first network switch chip is a first Ethernet switch configured to operate at 100 terabits per second, and the second network switch chip is a second Ethernet switch configured to operate at 100 terabits per second, and the third network switch chip is a third Ethernet switch configured to operate at 100 terabits per second, and the fourth network switch chip is a fourth Ethernet switch configured to operate at 100 terabits per second.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. A photonic chip pod, comprising:
a substrate;
a photonic input/output chiplet attached to the substrate, the photonic input/output chiplet including a parallel electrical interface, a photonic interface, and a plurality of optical macros implemented between the photonic interface and the parallel electrical interface, the photonic input/output chiplet disposed on the substrate with a first portion of the photonic input/output chiplet overlying the substrate and with a second portion of the photonic input/output chiplet extending beyond an edge of the substrate in a direction away from the edge of the substrate, the second portion of the photonic input/output chiplet including the photonic interface; and
a gearbox chiplet attached the substrate in electrical connection with the parallel electrical interface of the photonic input/output chiplet, the gearbox chiplet configured to provide conversion between the parallel electrical interface of the photonic input/output chiplet and a serial electrical interface of another chip.

2. The photonic chip pod as recited in claim 1, wherein the substrate is either a 2.5D integration substrate, a silicon interposer substrate, or an optically-enabled wafer-level fanout substrate.

3. The photonic chip pod as recited in claim 1, wherein the serial electrical interface of said another chip is either an extra short reach (XSR) serial interface or an ultra short reach (USR) serial interface.

4. The photonic chip pod as recited in claim 1, wherein the parallel electrical interface of the photonic input/output chiplet is either an advanced interface bus (AIB) interface or a high-bandwidth interconnect (HBI) interface.

5. The photonic chip pod as recited in claim 1, wherein the photonic interface of the photonic input/output chiplet includes a plurality of optical alignment structures configured to respectively receive and position a plurality of optical fibers for respective optically coupling with a plurality of optical grating couplers formed within the photonic input/output chiplet.

6. The photonic chip pod as recited in claim 1, wherein each of the plurality of optical macros of the photonic input/output chiplet includes a plurality of optical microring resonators, wherein each optical microring resonator of the plurality of optical microring resonators has an outer diameter of less than or equal to about 10 micrometers.

7. The photonic chip pod as recited in claim 1, wherein the second portion of the photonic input/output chiplet extends beyond the edge of the substrate by a distance of about 3 millimeters as measured in a direction perpendicular to the edge of the substrate.

8. The photonic chip pod as recited in claim 1, wherein the substrate extends at least about 1 millimeter beyond each outer edge of the first portion of the photonic input/output chiplet.

9. The photonic chip pod as recited in claim 1, wherein the substrate extends at least about 1 millimeter beyond each outer edge of the gearbox chiplet.

10. The photonic chip pod as recited in claim 1, wherein the gearbox chiplet is positioned about 1 millimeter away from the photonic input/output chiplet.

11. The photonic chip pod as recited in claim 1, wherein the photonic input/output chiplet and the gearbox chiplet are the only chiplets attached to the substrate.

12. The photonic chip pod as recited in claim 1, further comprising:

a fiber array unit optically coupled to the photonic inter-
face of the photonic input/output chiplet.

13. The photonic chip pod as recited in claim 12, wherein the fiber array unit includes a plurality of optical fibers and a mechanical transfer ferrule, wherein a first end of each of the plurality of optical fibers is secured within the mechani-cal transfer ferrule, and wherein a second end of each of the plurality of optical fibers is secured within the photonic interface of the photonic input/output chiplet.

14. The photonic chip pod as recited in claim 13, wherein the fiber array unit has 16 optical fibers.

15. The photonic chip pod as recited in claim 13, wherein the fiber array unit has 24 optical fibers.

16. The photonic chip pod as recited in claim 1, wherein a surface of the substrate onto which the photonic input/output chiplet and the gearbox chiplet are attached has a surface area of about 132 square millimeters.

17. The photonic chip pod as recited in claim 16, wherein the substrate has a length of about 12 millimeters and a width of about 11 millimeters.

18. The photonic chip pod as recited in claim 1, wherein a surface of the first portion of the photonic input/output chiplet that overlies the substrate has a surface area of about 54 square millimeters.

19. The photonic chip pod as recited in claim 1, wherein a surface of the second portion of the photonic input/output chiplet that extends beyond the edge of the substrate has a surface area of about 27 square millimeters.

20. The photonic chip pod as recited in claim 5, wherein each of the plurality of optical alignment structures is a respective v-groove.

\* \* \* \* \*